US012596066B2

(12) United States Patent
Ben-Yoav et al.

(10) Patent No.: US 12,596,066 B2
(45) Date of Patent: Apr. 7, 2026

(54) ELECTROCHEMICAL DEVICE

(71) Applicant: B.G. Negev Technologies & Applications Ltd., at Ben-Gurion University, Beer-Sheva (IL)

(72) Inventors: Hadar Ben-Yoav, Ramat Gan (IL); Rajendra Prasad Shukla, Ghaziabad (IN); Matan Aroosh, Kiryat Gat (IL)

(73) Assignee: B.G. NEGEV TECHNOLOGIES & APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 352 days.

(21) Appl. No.: 17/956,336

(22) Filed: Sep. 29, 2022

(65) Prior Publication Data

US 2023/0104086 A1 Apr. 6, 2023

Related U.S. Application Data

(60) Provisional application No. 63/250,627, filed on Sep. 30, 2021.

(51) Int. Cl.
*G01N 15/10* (2024.01)
*G01N 15/12* (2024.01)
(Continued)

(52) U.S. Cl.
CPC ..... *G01N 15/1023* (2024.01); *G01N 27/3277* (2013.01); *G01N 27/48* (2013.01); *G01N 2015/135* (2024.01)

(58) Field of Classification Search
CPC ........... G01N 15/1023; G01N 27/3277; G01N 27/48; G01N 2015/135; G01N 27/3271; G01N 27/308; G01N 27/27
See application file for complete search history.

(56) References Cited

U.S. PATENT DOCUMENTS

| | | | |
|---|---|---|---|
| 6,187,164 B1 * | 2/2001 | Warren | ............... B01J 19/0046 205/136 |
| 2014/0332410 A1 | 11/2014 | Ben-Yoav et al. | |
| 2020/0138344 A1 * | 5/2020 | Ben-Yoav | .......... A61B 5/14507 |

FOREIGN PATENT DOCUMENTS

| | | | | |
|---|---|---|---|---|
| DE | 102004031370 A1 * | 1/2006 | ......... | G01N 27/3277 |
| WO | 2018/225058 | 12/2018 | | |

OTHER PUBLICATIONS

Shukla et al., A platinum black-modified microelectrode for in situ olanzapine detection in microliter volumes of undiluted serum, Jan. 6, 2020, Journal of Neural Transmission, 127:291-299 (Year: 2020).*

(Continued)

*Primary Examiner* — James Lin
*Assistant Examiner* — Sommer Yousef Osman
(74) *Attorney, Agent, or Firm* — Nixon & Vanderhye PC

(57) ABSTRACT

An electrochemical microsensor comprising an array of working microelectrodes, the working microelectrodes include:
one or more bare microelectrodes;
one or more thick film-coated microelectrodes, optionally with conductive additive incorporated into the coating, selected from the group consisting of polysaccharide-coated microelectrodes and platinum black-coated microelectrodes;
one or more thin film-coated microelectrodes selected from the group consisting of reduced graphene oxide-coated microelectrode and transition metal chalcogenide-coated microelectrodes;
wherein the electrochemical microsensor further comprises a counter electrode and optionally one or more reference microelectrode(s).

15 Claims, 10 Drawing Sheets

(51) Int. Cl.
   *G01N 27/327* (2006.01)
   *G01N 27/48* (2006.01)

(56) References Cited

OTHER PUBLICATIONS

Ben-Yoav et al., An Electrochemical Micro-System for Clozapine Antipsychotic Treatment Monitoring, 2015, Electrochimica Acta, 163, pp. 260-270 (Year: 2015).*

Wang et al., Fabrication of riboflavin electrochemical sensor based on homoadenine single-stranded DNA/molybdenum disulfide-graphene nanocomposite modified gold electrode, 2015, Journal of Electroanalytical Chemistry, 736, pp. 47-54 (Year: 2015).*

Subramanian et al., Electrochemically Exfoliated Porous WS2 Nanosheets: A Potential Electrochemical Sensing Platform for Chlorpromazine Detection, 2019, Journal of the Electrochemical Society, vol. 166, B749-B755 (Year: 2019).*

Kim et al., Programmable "Semismart" Sensor: Relevance to Monitoring Antipsychotics, 2015, Advanced Functional Materials, 25, pp. 2156-2165 (Year: 2015).*

Kang et al., Reliable clinical serum analysis with reusable electrochemical sensor: Toward point-of-care measurement of the antipsychotic medication clozapine, 2017, Biosensors and Bioelectronics, 95, pp. 55-59 (Year: 2017).*

Zhao et al., A flexible Ag/AgCl micro reference electrode based on a parylene tube structure, 2017, Sensors and Actuators B: Chemical, 247, pp. 92-97 (Year: 2017).*

Paulus et al., English translation of DE-102004031370-A1, 2006 (Year: 2006).*

Yin et al., High-quality molybdenum disulfide nanosheets with 3D structure for electrochemical sensing, 2016, Applied Surface Science, 385, pp. 63-71 (Year: 2016).*

Narayanan et al., Selective and efficient electrochemical biosensing of ultrathin molybdenum disulfide sheets, 2014, Nanotechnology, 25, pp. 1-7 (Year: 2014).*

Dimaki et al., A Compact Microelectrode Array Chip with Multiple Measuring Sites for Electrochemical Applications, 2014, Sensors, 14, 6, 9505-9521 (Year: 2014).*

Aroosh, M., et al., "Intelligent Microelectrodes Array for Schizophrenia Treatment Monitoring" Proceedings of the 7th Intl Electronic Conference on Sensors and Applications, Nov. 15-30, 2020, MDPL: Basel Switzerland, doi:10.3390/esca-7-08217 (abstract, poster and presentation) (Nov. 14, 2020).

K.M. Naik., et al., "Electrochemical response of hydroxyurea by different voltametric techniques at carbon paste electrode" Anal. Methods, 5, pp. 6947-6953, Oct. 3, 2013, https:doi.org/10.1039/C3AY41680A.

K.M. Naik et al., Novel electroanalysis of hydroxyurea at glassy carbon and gold electrode surfaces, J. Electrochem. Sci. Eng., vol. 4(3), pp. 111-121, Sep. 22, 2014; https://doi.org/10.559/jese.2014.0064..

K.M. Naik et al., "Anodic voltammetric behavior of hydroxyurea and its electroanalytical determination in pharmaceutical dosage form and urine" Journal of Electroanalytical Chemistry, vol. 755, pp. 109-114, https://doi.org/10.1016/j.jelechem 2015.07.038, Jul. 31, 2015.

Ahmadvand T., et al., "A novel low-cost method for fabrication of 2D multi-electrode array (MEA) to evaluate functionality of neuronal cells" in Proceedings of the 1st International Electronic Conference on Biosensors, Nov. 2, 2020, MDPI: Basel, Switzerland doi: 10.3390/IECB2020-07087.

Cazelles, R. Shukla et al., "Electrochemical determination of Hydroxyurea in a complex biological matrix using MoS2-modified electrodes and chemometrics", Biomedicines Sep. 6, 2021. https://dx.doi.org/10.3390/biomedicines 9010006 (Dec. 24, 2020).

* cited by examiner

FIGURE 4

ELECTROCHEMICAL DEVICE

This application claims priority to U.S. Provisional Application No. 63/250,627 filed Sep. 30, 2021, the entire content of which is hereby incorporated by reference.

There exists a need to monitor regularly drug levels in biofluid samples taken from patients prescribed, e.g., with antipsychotic drugs. Some drugs lend themselves to electrochemical detection e.g., in blood or urine samples, owing to their ability to undergo oxidation-reduction reaction to generate concentration-dependent electrochemical signal. For example, one major electrochemical detection technique is voltammetry, in which the measurement set-up consists of a working electrode, a counter electrode and optionally a reference electrode, electrically connected to a potentiostat. The current at the working electrode is measured as the potential applied across the working electrode and the counter electrode is varied linearly with time. When electroactive species are present in the tested sample, they undergo oxidation (or reduction) when the potential on the working electrode is sufficiently positive (or negative). The oxidation/reduction electrochemical reactions are manifested by an increase in the current (anodic or cathodic) measured; that is, creation of an electrochemical signal with magnitude and position characteristic of a given analyte.

The approach is illustrated in FIG. 1, where it is seen that clozapine present in a blood sample undergoes oxidation, transferring two electrons to an electrode (a surface modified gold electrode, e.g., coated with chitosan film to which carbon nanotubes were added). Current versus voltage plots indicate a steady increase in peak intensity with increasing drug concentration in the sample, attesting to the detectability of clozapine by the proposed approach. See also US 2014/0332410 regarding the electrochemical detection of clozapine in blood samples with the aid of microdevices.

It is also seen in FIG. 1 that interferants present in biofluid samples may likewise undergo redox reactions. In our earlier publication WO 2018/225058 it was shown that the masking effect of such interferants could be minimized and detectability of an analyte improved with the aid of an electrochemical sensor based on an array of multiple electrodes, i.e., bare gold electrode(s) alongside surface modified electrodes. The major electrode surface modifications shown in our earlier work described in WO 2018/225058 included a chitosan coating, a chitosan coating to which carbon nanotubes were added, and reduced graphene oxide. For example, concentration of dopamine was predicted accurately by such an array, despite the presence of two interferants (norepinephrine and uric acid) in the tested sample. That is, the electrochemical sensor disclosed in WO 2018/225058 includes a set of electrodes that are surface-modified with materials that possess different electron and mass transfer rates, thereby generating slightly diverse electrochemical signals from the analyzed redox-active mixture. The complex pattern of electrochemical signals generated by multiple redox molecules present in the tested sample is then analyzed with advanced pattern recognition algorithms.

We have now introduced some modifications to the electrochemical device described in WO 2018/225058, to enhance its sensitivity towards redox active drugs such as clozapine and enable their detection even in small (microliters) blood sample volumes. The modifications reside in the chemical composition and thickness of the films that are used to coat the electrodes, and in the design (shape and size) of the multielectrode array. Experimental results reported below indicate that incorporation into the multielectrode array of WO 2018/225058 two or more additional electrodes coated with especially thin films (few nanometers thick), e.g., thin films consisting of electrocatalytically active transition metal chalcogenides, such as sulfides of molybdenum and tungsten, and the fabrication of the multielectrode array in a miniature design described below, enable detection of clozapine in finger-prick sample volumes from schizophrenia patients, with limit of detection (LoD) as low as $\sim0.08\pm9.2\times10^{-4}$ µM and $0.45\pm0.04$ µM for capillary plasma and capillary whole blood samples, respectively, in good agreement with analytical results obtained by liquid chromatography-mass spectrometry.

Accordingly, one aspect of the invention is an electrochemical microsensor comprising an array of working microelectrodes, which includes:

one or more bare microelectrodes (e.g., gold microelectrodes);

one or more thick film-coated microelectrodes (e.g., polysaccharide-coated gold microelectrodes, optionally with conductive additive incorporated into the coating, such as carbon nanotubes, and platinum black-coated gold microelectrodes);

one or more thin film-coated microelectrodes (e.g., reduced graphene oxide-coated gold microelectrode and/or transition metal chalcogenide-coated gold microelectrodes, e.g., $MS_2$; M=Mo or $WS_2$); and a counter electrode and optionally one or more reference microelectrode(s).

In operation, the microelectrodes are electrically connected to potentiostat or galvanostat which control the potential or current of the working electrodes, respectively, to create a data set of electrochemical signals when the electrodes are in contact with the test sample. The data set of electrochemical signals is analyzed by a processor applying one or more chemometric techniques.

By "thick film" and "thin film" we mean that the thickness of the films is in the range from 3 to 100 µm and 1 to 3,000 nm, respectively.

The present invention also provides a method of electrochemical detection of clozapine in capillary whole blood sample or capillary plasma sample, e.g., finger-prick blood sample, the method comprising:

bringing the blood sample into contact with the electrochemical sensor described herein;

applying varied voltage, fixed voltage, current or impedance across the working microelectrodes;

measuring the current flowing or the impedance between each of the working electrodes and a counter electrode, or the potential between each of the working electrodes and a reference electrode, to obtain a raw data set consisting of a plurality of electrochemical signals;

preprocessing the raw data electrochemical signals; and applying chemometric method(s) to the preprocessed data, to quantify clozapine in the blood sample.

The preferred clozapine-sensing electrochemical technique is voltammetry (application of varied voltage and measurement of current), such as differential pulse voltammetry (DPV).

For example, the electrochemical microsensor comprises an array of:

1) one or more bare microelectrodes;

2) one or more polysaccharide-coated microelectrodes;

3) one or more polysaccharide-coated microelectrodes with conductive additives incorporated into the coating, e.g., with carbon nanotubes added to the coating;

4) one or more platinum black-coated microelectrodes;

5) one or more reduced graphene oxide-coated microelectrodes;

6,7) one or more $MS_2$-coated microelectrodes (6: M=Mo; 7: M=W);

8) one or more reference microelectrode; and 9) a counter electrode.

The total number of microelectrodes in the array is designated by the capital letter N. The number of microelectrodes in each of the nine subsets set out above is indicated by $n_1$, $n_2$, $n_3$, $n_4$, $n_5$, $n_6$, $n_7$, $n_8$ and $n_9$, respectively. For example: $N=\{1 \leq n_1 \leq 5; \ 1 \leq n_2 \leq 5; \ 1 \leq n_3 \leq 5; \ 1 \leq n_4 \leq 5; \ 1 \leq n_5 \leq 5; \ 1 \leq n_6 \leq 5; \ 1 \leq n_7 \leq 5; \ 1 \leq n_8 \leq 3; \ n_9 = 1\}$.

The microelectrodes are preferably made of noble metals, e.g., gold, platinum, rhodium and iridium. Also, other electrodes, such as glassy carbon electrodes, can be incorporated into the array of working electrodes. Gold is generally preferred, both for use as bare microelectrodes and film-coated microelectrodes. The experimental work reported herein indicates that good results are obtained using equal number of gold working microelectrodes of each type of surface modification; that is, $n_1 = n_2 = n_3 = n_4 = n_5 = n_6 = n_7 = 3$.

In WO 2018/225058 an example of an electrochemical sensor with cylindrical geometry was shown, e.g., a cylindrical body made of silicon, polyvinyl alcohol or polydimethylsiloxane, which was 2 to 5 cm long and with diameter is in the range from 2 to 3 cm. The electrodes were deployed on one base of the tubular body: a reference electrode positioned concentrically and coaxially in respect to the cylindrical body, a ring-shaped counter electrode encircling the reference electrode; and multiple surface modified working electrodes positioned in radial direction from the reference and counter electrodes and evenly distributed along the perimeter of the base of the cylindrical body. The opposite base provides the electrical wiring to be connected to potentiostat/galvanostat (the electrodes extend along the cylindrical body and are connected to the wiring in the opposite base). When put to use, the electrochemical sensor is simply immersed in a solution to be analyzed such that the base of the cylinder, where the electrodes are disposed, is exposed to the solution allowing the electrodes that (optionally) protrude from the base to be dipped into the liquid sample, creating the electrochemical cell for the measurements.

Now, however, microfabrication-based configurations are provided for the electrochemical sensor, which are needed because the volumes of blood samples available for measurements are very small (finger-prick blood samples). Accordingly, a lab-on-chip configuration in which the $N=\{1 \leq n_1 \leq 5; \ 1 \leq n_2 \leq 5; \ 1 \leq n_3 \leq 5; \ 1 \leq n_4 \leq 5; \ 1 \leq n_5 \leq 5; \ 1 \leq n_6 \leq 5; \ 1 \leq n_7 \leq 5; \ 1 \leq n_8 \leq 3; \ n_9 = 1\}$ are deployed, is now described.

The microelectrodes are patterned on a suitable substrate, e.g., a glass substrate, such as borosilicate glass. A gold-made microelectrode usually rests on a metallic base attached to the glass surface, e.g., a titanium base, which typically corresponds in shape and size to the gold microelectrode, because titanium adheres strongly to the glass substrate. One suitable design for arranging the N microelectrodes is shown in FIGS. 2 through 3(i)-3(iii). It consists of a disc-shaped counter electrode (e.g., of diameter in the range from 200 to 500 μm) and a total of N-1 working and reference microelectrodes placed evenly around the perimeter of the disc-shaped counter electrode, equidistantly from the center of the disc-shaped counter electrode. The diameter of each individual working (or reference) microelectrode is from 10 to 100 μm.

For example, the electrochemical cell consists of an array of twenty-one modified and bare gold working microelectrodes, two Ag/AgCl electroplated reference microelectrode and one big bare gold electrode in the center to be used as a counter electrode. The counter electrode is placed in the center and surrounded by the working and reference electrode. The surface area of the counter electrode is kept higher than the total surface area of all the twenty-one working electrodes to insure that the half-cell reaction occurring at the counter electrode is fast enough so that it will not affect the process at working electrodes.

Each of the N-1 working and reference microelectrodes is individually confined within a microchamber, which corresponds in size and shape to the microelectrode, leaving the upper surface of the microelectrode accessible to a solution/liquid sample. The entire set of N electrodes is encircled by the walls of a larger microchamber, defining a receptable for holding a solution/liquid sample and defining the exposed area of the microelectrode. The volume of the receptable is about 10 to 30 μL.

The microstructures described above (microelectrodes, microchambers encompassing the microelectrodes, all confined within a recessed zone that serves as a receptable for holding the liquid sample) can be created at the desired sites over the substrate by techniques such as etching and photolithography. The latter technique is preferred and is illustrated in detail in the experimental work reported below, in reference to FIG. 4. Briefly, the substrate is cleaned, a first photoresist is applied (either negative, positive or image reversal resist), e.g., by spin coating, spray coating or dip coating, to produce a thin uniform layer on the substrate, followed by soft baking. A first mask is aligned, to transfer the pattern corresponding to electrodes' sites onto the surface of the substrate. The photoresist is exposed through the pattern on the mask with UV light, followed by a development step. Next, bare microelectrodes are deposited in the intended sites, e.g., first titanium which serves as an adhesion layer and then gold followed by lift off procedure that resulted in a gold microelectrode array on glass substrate. In order to define the electrode effective surface area, another lithography step was done using, e.g., SU-8 photoresist. To define the chamber for fluid, another photolithography step was followed with e.g., thick SU-8 resist.

Having patterned the microstructures on the substrate, the desired coatings are applied on the gold microelectrodes, for example, by electrodeposition. In general, formation of a coating onto the surface of a microelectrode can be accomplished from a deposition solution by the following electrodeposition techniques:

(i) galvanostatic electrodeposition (chronopotentiometry), in which a constant current is passed through the microelectrode(s) to be coated;

(ii) potentiostatic electrodeposition (chronoamperometry), in which a constant potential is applied on the working microelectrode(s) to be coated; or (iii) cyclic voltammetry electrodeposition.

When on-chip reference Ag/AgCl microelectrode(s) are desired, then it is better to start the surface modification of the multielectrode array with the production of these reference microelectrodes, i.e., by creation of Ag/AgCl coatings onto one or more microelectrodes. This is achieved via a twostep process; 1) Ag electroplating, and 2) Ag anodization in a chloride solution.

In the first step, a suitable Ag electrodeposition solution is prepared by dissolving in water a silver source (e.g., $AgNO_3$ or $Ag_2SO_4$, at a concentration from 3 to 10% by weight). Stabilizers such as piperazine which prevent the silver ions from forming nanoparticles can also be added. The solution is made somewhat alkaline (e.g., $8 \leq pH \leq 10$) by addition of a weak base such as ammonium hydroxide. The electrodeposition is driven effectively in a continuously stirred $Ag^+$ deposition solution (agitation rate is from 50 to 400 RPM), using a two-electrode cell configuration, with the application of a constant current from a DC source or a galvanostat. A cathodic current, fixed in the range from 0.1 to 100 A m$^{-2}$, is passed between the electrodes. In case that more than one reference microelectrode is sought to be included in the array, then these microelectrodes are connected simultaneously to the counter electrode to become electroplated with silver (Ag$^0$) layer by the reduction of Ag$^+$ from the solution. In general, the electroplating lasts a few minutes, usually not more than fifteen minutes, depending on the concentration of the deposition solution, agitation rate, etc.

In the second step, about quarter to third of the amount electrodeposited metallic silver on the microelectrode is converted into AgCl(s) through electrochemical anodization of the silver-coated microelectrodes in a continuously stirred aqueous chloride solution such as hydrochloric acid or sodium chloride, at a constant voltage. A three-electrode configuration can be used, which includes the silver-coated microelectrodes as working electrode(s), Ag/AgCl as reference electrode, and a ring or wire Pt counter electrode. A fixed voltage in the range from 0 to 0.5 V, for example, about 0.2V (vs Ag/AgCl) is applied to the Ag-coated microelectrodes over five to fifteen minutes. Through this twostep process, two or more Ag/AgCl reference microelectrodes are incorporated into the multielectrode array.

Next, the working microelectrodes (divided into subgroups, as explained above) are modified to create the desired coatings onto their surface (each subgroup of working microelectrodes possesses the same coating). The microelectrode coatings were done in the order of lowest pH coating solution to highest pH coating solution. A reverse order of coatings' formation is undesired because strongly acidic (low pH) coating solutions may affect previously prepared coatings.

Platinum black film can be generated via galvanostatic electrodeposition onto one or more microelectrodes, by passing a constant current (a cathodic current, with current density fixed in the range of 4 to 6 mA/cm$^2$, for 3 to 7 minutes; for example, a current density of 5 mA/cm$^2$ is supplied over five minutes), through a deposition solution in which a suitable platinum source is dissolved, e.g., by electrochemical reduction of chloroplatinic acid dissolved in DI water at a concentration in the range of 1% (v/v in water) to 3% (v/v in water), in the presence of about 0.05% (v/v in water) of lead acetate. Lead acetate enhances the electrode reaction (i.e. the reduction of Pt) in presence of platinum black solution and it also strengthens the adhesion of the coating to the electrode. The pH of the deposition solution is shifted to the strongly acidic by addition of hydrochloric acid. A two-electrode configuration can be used, which includes the microelectrodes to be coated as working electrode(s) and a ring or wire Pt counter electrode.

Another type of film-forming material that is applied to create film-coated microelectrode(s) in the lab-on-chip device of the invention is reduced graphene oxide. The deposition solution is prepared by known methods, e.g., the Hummers' method, where oxidation of graphite flakes or powder takes place upon adding the graphite to a cold solution of sulfuric acid (e.g., 0° C.) followed by gradual addition of sodium nitrate and potassium permanganate under continuous stirring. For example, on a laboratory scale, the addition time of each of the successively added NaNO$_3$ and KMNO$_4$ reagents is not less than ten to fifteen minutes. On completion of reagent's addition, the reaction mixture is heated to about 35-45° C. and kept under stirring for a couple of hours, e.g., not less than two hours. The reaction is terminated by addition of water and hydrogen peroxide which removes excess permanganate. The graphene oxide is recovered by centrifugation and freeze dried and used to prepare deposition solution with concentrations in the range from 0.1 to 0.9 mg/ml GO. A deposition solution can also be prepared by a modified Hammers procedure, which consists of adding the graphite powder (or flakes) to a mixed sulfuric acid/phosphoric acid solution (e.g., proportioned about 9:1 by volume), followed by the slow addition of KMnO$_4$. The mixture is kept under stirring for couple of hours at a slightly elevated temperature (at 30-35° C.) until the mixture acquires a dark green color. Termination of the reaction is achieved by slow addition of H$_2$O$_2$ aqueous solution (e.g., the commercial 30% w/w solution). Graphene oxide is recovered through acidification of the mixture by hydrochloric acid (e.g., addition of commercial 32% HCl solution and DI), centrifugation of the resulting solution, washing of the supernatant with HCl/water, drying of the washed solution (e.g., at 90° C. in an oven) and collecting the GO powder. The dried GO powder is dissolved in DI, usually up to concentration of 0.5 g/L GO concentration. Addition of an electrolyte to the GO solution affords the GO electrodeposition solution. Next, r-GO is obtained electrochemically from the GO solution onto the microelectrode (Au) surface, using cyclic voltammetry electrodeposition, in a three-electrode cell configuration consisting of the microelectrode(s) as working electrode(s); an externally applied Pt wire as counter electrode and Ag/AgCl as reference electrode. The GO solution is added to the chamber; a potential window, for example from −1.4. to 1.4V (versus Ag/AgCl) is scanned at rate of in the range of to 50 to 500 mV/s, with number of cycles varying from 1 to 5.

Electrodeposition of MoS$_2$ and WS$_2$ films on the surface of one or more microelectrode(s) can be carried out by cyclic voltammetry, using a three-electrode configuration, which includes the microelectrode(s) to be coated as working electrode(s), Ag/AgCl as reference electrode and a ring or wire Pt counter electrode, by scanning the potential window of 0 to 1.4 V (versus Ag/AgCl) at rate of 50 to 100 mV/s, with number of cycles varying from 10 to 20. Suitable deposition solutions include 1-2 mg/mL MoS$_2$ or WS$_2$ dissolved in 0.1M sulfuric acid solution.

Electrodeposited chitosan film-coated microelectrode can be prepared with the aid of a deposition solution with chitosan concentration in the range from 0.5 to 2 wt %, preferably from 0.8 to 1.2 wt %, prepared by dissolving chitosan in a strongly acidic environment, whereby the amino groups undergo protonation to reach a slightly acidic pH (5-6). As pointed out above, conductive additives can be included in the deposition solution; these additives will co-deposit and affect the film properties. The concentration of the additives in the deposition solution (e.g., carbon nanotubes (abbreviated herein CNT), gold nanoparticles and platinum nanoparticles) is in the range from 0.1 to 2%, preferably from 0.8 to 1.8 wt %. For example, chitosan-CNT electrodeposition solution can be prepared by mixing a chitosan solution as previously described with CNTs, followed by ultra-sonication. The arrayed chip is immersed in the chitosan deposition solution (or chitosan/CNT solution) and electrodeposition is achieved by the chronopotentiometry technique, i.e., selected microelectrodes to be coated are biased to the negative potential against a counter electrode with constant (cathodic) current being applied between the electrodes for a period of time of 0.5 to 5 min, supplied by a DC current source; typically the current is set in the range from 3 to 6 μA/cm$^2$. A two-electrode configuration can be used, i.e., the counter electrode is shorted to reference terminal. Weakly bound chitosan is removed from the microelectrode surface, by immersing the device in a buffer solution.

Upon completion of the surface modification of the whole set of microelectrodes by the various electrodeposition techniques set out above, the microchip device is rinsed to remove non-deposited material and is ready for use. Typical thicknesses of the films produced (measured by atomic force microscopy or profilometry) are:

polysaccharide (e.g., chitosan) film: from 5 to 20 µm;

polysaccharide (e.g., chitosan) film with conductive additives: from 5 to 60 µm;

platinum black film: from 6 to 10 µm;

reduced graphene oxide film: 350 to 550 nm;

$MoS_2$ film: 10 to 20 nm (very thin nanoflakes); and $WS_2$ film: 10 to 20 nm (very thin nanoflakes).

Cyclovoltammetry in a solution of the ferrocyanide/ferricyanide redox couple [$Fe(CN)_6^{3-} \leftrightarrows Fe(CN)_6^{4-}$], to investigate the electrochemical response of the chips, followed by measurements of the thickness of the coatings, show that the microelectrodes are reproducible, yield repeatable results and are storage stable. For example, variation at film thickness was below 10% for all types of coatings after four or five repeated cyclovoltammetry experiments. The microchips exhibit nearly unvarying electrochemical response (indicated by virtually stable oxidation currents measured in the voltammograms plotted for the [$Fe(CN)_6^{3-} \leftrightarrows Fe(CN)_6^{4-}$] redox couple, as shown in the experimental results reported below).

FIG. 10 provides a schematic illustration of the electrochemical sensor according to the invention and a detection device into which the sensor is incorporated, i.e., either a portable device or a fixed device placed in a lab etc.

An electrochemical sensor in the form of a microfabricated 1.5 cm×1.5 cm chip (1) on a glass substrate is shown in FIG. 10. It can be a portable device or can be placed in the lab. The device dimensions are compatible with the conventional microfabrication techniques where the diameter of the working microelectrodes (4) are ~100 micrometer and the diameter of counter electrode (3) is ~500 micrometer. The chamber (5) is designed to hold small volume samples (10-30 microliter—as sample volumes available are quite low). Reference electrode (2) can be integrated into the array by electroplating one or two microelectrodes with Ag/AgCl as previously described. There are two kinds of chambers, a small chamber for each microelectrode opening (4 and 3) and a bigger chamber to carry the fluid (5). The chambers are made of insulating polymer, e.g., SU-8 polymer (6). The contacts pads (7) can be connected via pogo pins (8) and then to the multichannel connection (9) of the potentiostat or galvanostat unit (12). The device may be powered (11) by a battery or alternatively, can be connected to a main power supply. The control unit (10) is designed to serve several purposes, chiefly controlling the potential of the working electrodes or the current flowing through the cell, respectively, according to the chosen electrochemical technique.

Accordingly, a specific aspect of the invention is a chip comprising a base substrate (e.g., made of oxidized silicon, e.g., a glass substrate or silicone/silicone oxide), the chip having a recessed region on its surface, defined by a wall made of electrically insulating polymer which is elevated in respect of said recessed region, such that the recessed region can serve as a receptable for a liquid sample (e.g., for 10 to 30 µl of a blood sample), with discrete microstructures placed inside said recessed region, wherein a microstructure consists of a microelectrode deposited atop of an adhesion layer attached to the base substrate, wherein each microstructure is encircled by a wall made of electrically insulating polymer, thereby defining a plurality of microchambers, the interior of which is occupied by the microstructures.

Preferred design employs the abovementioned epoxy-based photoresist SU-8 as the electrically insulating polymer providing the walls of the sample holder, i.e., the receptable (also named herein 'the large chamber') and of the individual chambers surrounding the microelectrodes. Preferred geometry involves a disc-shaped counter electrode concentrically located inside the recessed region, which is circular in shape, with the microstructures placed along the perimeter of the recessed region.

In operation, 10 to 30 µl of a blood sample (from a conventional blood sample collecting and transfer device used to collect blood samples by touching the fingertips of the patient, e.g., medical sticks and the like) is dropped onto the receptable, i.e., chamber (5), to cover the electrodes (2, 3 and 4) in the array and create an electrochemical cell to conduct the measurements. Another, more complicated design (not shown) may include a microfluidic channel patterned on the substrate (6), to deliver, with the aid of a pump, the blood sample from a feed point located on the chip to chamber (5). In that case, the supply of the blood sample to chamber (5) would be controlled by controller (10).

The device may further include a data storage unit or a data transmitting unit (13), i.e., wired transmitter or a wireless network transmitting unit with conventional communication ports to deliver the data to an externally located data storage unit.

A data storage unit may be the memory of the data processing unit or any computer readable media. In FIG. 10, personal instruments (15) are shown and also a cloud-based data storage system (16).

The device further comprises a processor (14) for analyzing a data set of electrochemical signals by one or more chemometric techniques, e.g., multivariate methods such as a supervised machine learning model (artificial neural network (ANN)), or a regression model, e.g. partial least square regression (PLSR).

Briefly, PLSR is a linear regression method and PLSR algorithms are available (e.g., MATLAB). As to ANN, a neural network model is generated with the aid of a training set. To this end, a matrix consisting of a large number of samples with known concentrations of the analyte and with known outputs is collected. As explained in more detail below, the data set is split to create a training set, a cross-validation set and a test set. In the training process, the error between the outputs predicted by the neural network and the known outputs is calculated; this process continues, with the algorithm adjusting the parameters iteratively to minimize the error, i.e., to reduce the error below an acceptable level. Once created, the model is saved and can be used for future measurements of test samples.

It should be noted that raw test data collected by the electrochemical sensor (e.g., a blood sample taken from a patient) undergoes pre-processing with the aid of known techniques before it is fed to the algorithm. Then methods such as principal component analysis (PCA), Fast Fourier Transform (FFT), and selection of important electrochemical signal features, can be used to reduce the dimensions of the data fed to the model. The latter method has been shown to be especially useful; the features selected (e.g., from the voltammograms) include peak current, peak potential, maximum slopes of the I vs. E function (for the increasing and decreasing parts of the function).

That is, to make a measurement of a test sample—using voltammetry for example—the sample is placed in the sample holder in contact with the electrochemical sensor in the device of the invention, as described above, varied voltage is applied by the potentiostat between the reference electrode and working electrode, currents generated are measured and the measurements are stored, and the test data collected (readings from all working electrodes) is preprocessed, reduced and scaled, fed to the ANN algorithm and the concentration of analyte is quantified.

One useful aspect of the invention is that the raw test data collected from a biofluid (i.e., from patients) can be used to calibrate the ANN trained model (that was previously trained using non-biofluid samples, e.g., samples prepared in buffer solutions).

The two approaches for model building—PLSR and ANN are now discussed in more detail; the major steps are outlined below. In both cases, data reduction is based on signal features.

Model Building Process—Based Signal Samples (PLSR)

1. Organization of data in a cell structure—with the aid of MATLAB software reading csv files, all experimental data is arranged in one type of structure (e.g. cell type).

2. Signal smoothing—By using the signal processing toolbox, MATLAB software 2017a version, a built-in function (e.g. 'filter') was used to filter the signals by employing a moving average window in order to reduce signal fluctuations and noisy behavior which is not originated by the electrochemical properties of the tested solution. A varied filter order in the range of 5<M<8, (M—filter order), depending on the noise level in the recorded data, was used. In order to keep this parameter as unbiased for all the recorded signals in each experiment, it was kept fixed and equal to specific value for each experimental data.

3. Baseline subtraction—In an electrochemical analysis, the main interest is the faradaic current that is generated owing to the electron transfer from the analyte to the electrode surface in a specific electric potential (oxidation potential). In order to improve signal to noise ratio (SNR), the Asymmetric least squares spline regression (AsLSSR) was used. With the aid of MATLAB software 2017a version, a function is built to estimate the baseline signal by getting two constant values parameters, $\lambda$ the smoothing parameter ($10^2 < \lambda < 10^9$) and p the asymmetry parameter ($0.001 < p < 0.1$). These two parameters take part in the numerical optimization of the cost function of the algorithm.

4. Organization of signals in a matrix structure—the signals are arranged in a matrix form, with each raw corresponding to specific array response. Signals were put in the matrix one after the other, to produce a super raw vector structure for each solution, while the target was defined as the concentration matrix, each column describing specific analyte concentration used through the experiments. This has been achieved by building MATLAB script (version 2017).

5. Dividing the data set into distinct subsets—The data is separated into two or three distinct sets. The first set is a training set, that is used for the training and the design of the model. All optimization procedures for finding the optimal solution are performed on the training set. It should be noted that the training set could be sub-divided to create a small cross-validation set. The other set is the test set. This set is used to check the model's generalization capabilities, by using the trained model in order to evaluate ability of the mode to predict the concentrations in the "unseen" samples. The data is usually divided as follows: 70-85% of the samples are assigned to the training set (including ~10% that may be used for cross-validation) and 10-30% for testing. The samples are divided randomly, but the computer's random generation is fixed to assure that the same subdivision could be reproduced.

6. Signals centering—In order to focus on the variability of each specific potential, data is centered, checking the average features value for the all set, and subtract it from the all signal, resulted with features with mean value equal to 0. The average value of the training set is saved for future use for centering the test set.

7. Choosing a regression model for prediction analysis—the partial least square regression (PLSR) model, a linear technique, was used. It is especially suitable for cases where there is a high correlation between the different features and when there is a limited number of samples (e.g. solutions). The 'plsregress' MATLAB function toolbox was used for model building and testing.

8. Choose optimal model parameters (k-fold cross validation)—In order to choose wisely different digital (e.g. number of latent variable in a PLSR model) and physical parameters (e.g. electrode combination) the CV method (LOOCV and 10-fold CV) was used. With the aid of a code that is able to give all the possible configurations without repetition, the CV was implemented in the MATLAB software 2017a version, using the 'cvpartition' function from the statistical toolbox, for random divisions into k sets. By dividing the train set and using it also for validation we were able to take advantage of most of the information hidden in the data. Model parameters minimizing the cross-validation error were chosen.

9. Model training—The best number of latent variables and best electrode combinations were chosen for training the model on all the training set. A PLSR model using the 'plsregeress' function from MATLAB statistics tool box (2017 version) was built.

10. Test Data pre-processing—The test signals were centered according to the mean average value of the training set.

11. Model predictability—The trained model was used to test and evaluate the performance on unseen data set, i.e., the test set, which was preprocessed and was ready for use as the model input.

12. Evaluate model performance—The quality of the model is assessed with the root mean square error between the known concentrations and those that were estimated by the model.

$$RMSE_{test} = \sqrt{\frac{1}{N_{test}} \sum_{i=1}^{N_{test}} (C_{expected} - C_{calculated})^2}$$

(N is the number of samples; $C_{expected}$ is the real actual value and $C_{calculated}$ is the predicted value).

Model Building Process—Based Direct Electrochemical Features (ANN)

1. organization of data in a cell structure—with the aid of MATLAB software, csv files are read, in order to arrange all the experimental data in one type of structure (e.g. cell type).

2. Signal smoothing—by using the signal processing toolbox, MATLAB software 2017a version, a built-in function (e.g. 'filter') was used to filter the signals by employing a moving average window in order to reduce signal fluctuations and noisy behavior which is not originated by the electrochemical properties of the tested solution. A varied filter order in the range of 5<M<8, (M—filter order), depending on the noise level in the recorded data, was used. In order to keep this parameter as unbiased for all the recorded signals in each experiment, it was kept fixed and equal to specific value for each experimental data.

3. Feature extraction—specific electrochemical signal features were extracted, i.e., features which are indicative of the identity of the redox-active molecule and its concentration in the solution. The extracted features include: peak potential, peak current, maximum slope of the signal, and current value at specific potentials (potentials which are known as the standard oxidation-reduction potential of specific analyte—good evaluation when the peak is not visible). All features extracted automatically using MATLAB software 2017a version built-in functions and by customary-built specific functions for each feature.

4. Organize features in a matrix structure—The extracted features were arranged in a matrix form, with each raw corresponding to specific array response, whereas each column describes specific analyte concentration through the experiment. This has been done by building MATLAB script (version 2017).

5. Dividing the data set into distinct subsets—The data is separated into two or three distinct sets. The first set is a training set, that is used for the training and the design of the model. All optimization procedures for finding the optimal solution are performed on the training set. It should be noted that the training set could be sub-divided to create a small cross-validation set, as explained below and further illustrated in the Examples below. The other set is the test set. This set is used to check the model's generalization capabilities, by using the trained model in order to evaluate ability of the mode to predict the concentrations in the "unseen" samples. The data is usually divided as follows: 70-85% of the samples are assigned to the training set (including ~10% that may be used for cross-validation) and 10-30% for testing. The samples are divided randomly, but the computer's random generation is fixed to assure that the same subdivision could be reproduced.

6. Feature normalization—Features were standardized using the z-score transformation (subtracting the mean value of each feature, and scaling it by dividing the value by the standard deviation). Scaling was preformed because the features were in different scales, such as peak currents [µA] and peak potentials [V]. The data transformation was achieved with the aid of MATLAB software 2017a version. The transformation was performed on the training set, when the moments value were saved for future scaling of the test data.

7. Feature selection—The strategy employed for data reduction to decrease computational complexity was ten-fold cross-validation forward selection based linear regression. The criterion for the selection was the root mean square error between the "real" concentration and those estimated for the validation set. This was achieved with the aid of the statistical toolbox of MATLAB software 2017a version. In each the experiments we used a different initial number of features depending on the technique that was chosen to extract data features.

8. Choosing regression model for prediction analysis—In order to perform multivariate analysis (not only one target value), artificial neural network (ANN) models were used—a nonlinear techniques—to explore the relation between the extracted features to the neurotransmitters concentration. The ANN MATLAB toolbox was used to explore different network architectures.

9. ANN model optimization (based k-fold cross-validation)—Simple ANN architectures, such as 1-hidden layer with limited number of neurons, was used in order to reduce the chance for overfitting—the lesser number of neurons in use the lower network complexity. The best architecture was chosen with the aid of a cross-validation test: the number of neurons in the hidden layer was varied to test the network performance on a validation set. The upper bound of the number of neuros was set such that it is smaller than the number of the model weights. Then the number of neurons with the best score (in terms of the root mean square error between the known concentration and those who were estimated on the validation set) was chosen. The test was repeated with different initial conditions (e.g. different weight initializations), because ANN models are significantly affected by their initial conditions; but in each individual test the parameters were fixed in order to make unbiased and robust decision 10. Model training—having determined the best architecture, it was now used for training the model across the entire training set. The number of the training iterations was limited (early stopping) according to a specific error value that was set to stop the training procedure after reaching at least 99% of the target variance. Hence a trained network which minimizes the performance on the training data is created, ready for future testing.

11. Test data pre-processing—Based on the selected features in the feature selection procedure, the test features were loaded and standardized according to the training moments. For each feature, the training mean value was subtracted and the result divided it by the training standard deviation (this procedure is based on the fact that the two sets sampled from the same data population), creating a scaled data set.

12. ANN predictability—The trained model was used to test and evaluate the performance on unseen data set, i.e., on the test set which was preprocessed and was ready for use as the model input. Calculations were performed in MATLAB software 2017a version, using the ANN toolbox function and aid function coded for specific tasks.

13. Evaluation of model performance—The quality of the model is assessed with the root mean square error (between the known $$RMSE_{test} = \sqrt{\frac{1}{N_{test}} \sum_{i=1}^{N_{test}} (C_{expected} - C_{calculated})^2}$$

(as previously defined) and the Pearson correlation coefficient (PCC):

$$PCC = \frac{E[C_{expected} - \mu_{expected}]E[C_{estimated} - \mu_{estimated}]}{\sigma_{expected}^2 \sigma_{estimated}^2}$$

The clozapine sensing performance in 20 µL volume of buffered samples, simulated serum samples, undiluted serum and whole blood samples of healthy volunteers, by the multielectrode sensor of the invention, was studied. The complex set of electrochemical signals generated from the biofluids were analyzed using PLSR chemometric model. The model performance was evaluated in terms of LoD, Pearson correlation coefficient, and predicted residual error sum of squares (PRESS). The model was used to predict clozapine levels in 2 and 4 µM spiked samples. The PLSR model shows a high degree of prediction performance for the clozapine spiked whole blood samples, as indicated by the data tabulated in Table 1.

TABLE 1

| Sample solution | PCC | LoD (µM) | PRESS | Factors | Prediction performance for | |
| | | | | | 2 µM | 4 µM |
| --- | --- | --- | --- | --- | --- | --- |
| Buffer | 0.99 | 0.04 ± 0.0004 | 0.17 | 1 | 1.8 ± 0.4 | 4.3 ± 0.5 |
| Simulated serum | 0.96 | 0.24 ± 0.03 | 0.23 | 2 | 1.7 ± 0.5 | 3.7 ± 0.6 |
| Undiluted serum | 0.93 | 0.35 ± 0.04 | 0.34 | 2 | 2.3 ± 0.6 | 3.8 ± 0.7 |
| Whole blood | 0.89 | 0.42 ± 0.03 | 0.4 | 2 | 1.5 ± 0.7 | 3.4 ± 0.8 |

The experimental work reported below shows that clozapine levels can be predicted in finger-prick microliter volume samples (20 µL volume sample) taken from schizophrenia patients without using any pretreatment step. The patient's samples were collected after the 8-10 weeks of clozapine dosing. The multielectrode array combined with multivariate PLSR model allows predicting accurately clozapine levels in 20 µL samples of undiluted capillary plasma and capillary whole blood patient samples. Table 2 shows the clozapine sensing performance using the multielectrode array of the invention combined with PLSR model, in relation to blood samples collected from schizophrenia patients. By integration of the electrochemical sensor described herein into point-of-care testing devices, schizophrenia treatment management can be improved.

TABLE 2

| Patients sample | Training | | | | Testing | |
| | PCC | LoD (ng/mL) | PRESS | Factors | 450 (ng/mL) | 131(ng/mL) |
| --- | --- | --- | --- | --- | --- | --- |
| Capillary plasma | 0.91 | 7.3 ± 2.1 | 1.5 | 3 | 441 ± 24.5 | 139 ± 13.6 |
| Capillary whole blood | 0.85 | 12.6 ± 4.3 | 1.6 | 3 | 438 ± 32.4 | 146 ± 18.3 |

Figure 4:
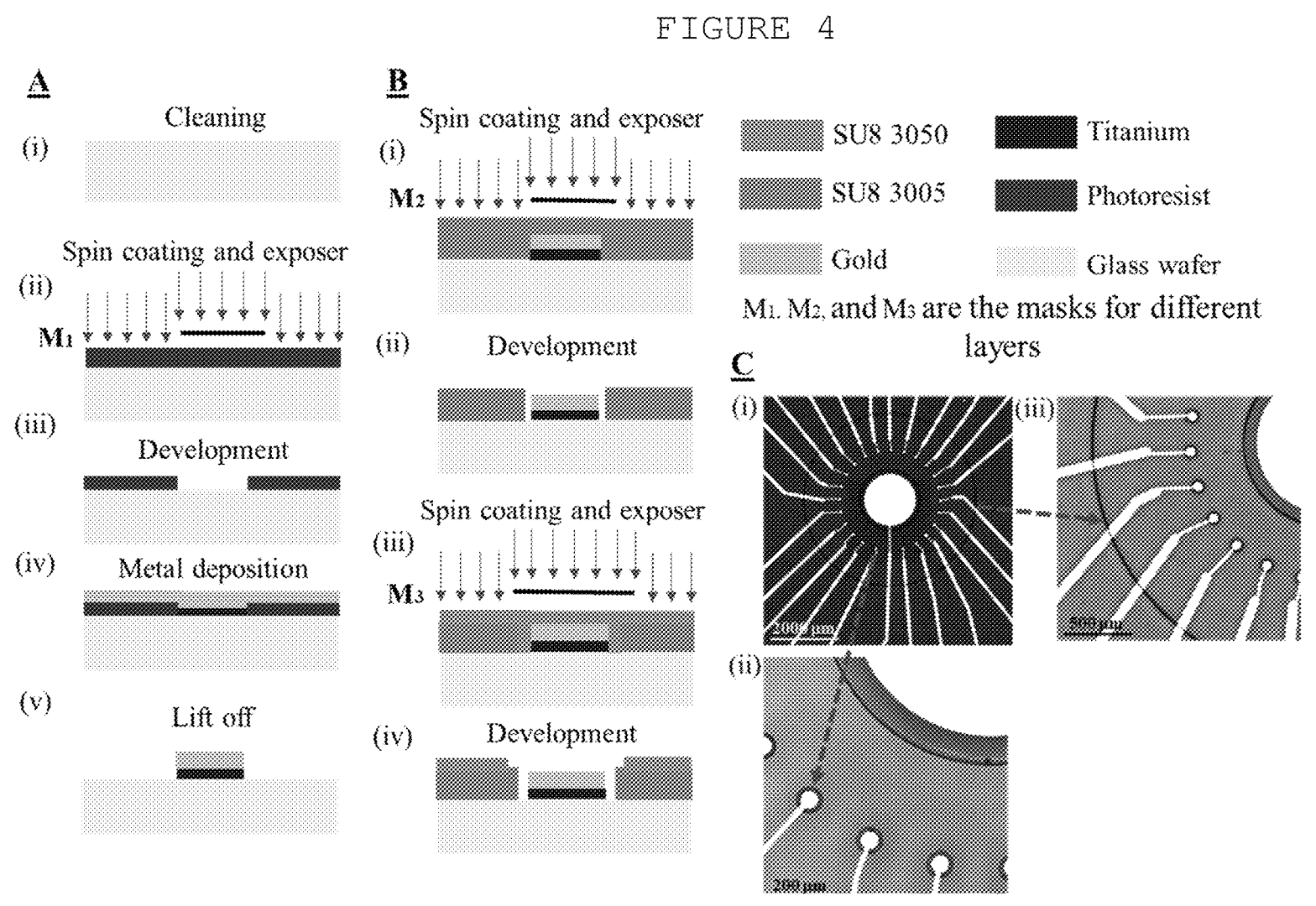

FIG. 4 schematically illustrates the fabrication of the multielectrode array using photolithography and metal deposition.

Figure 1:
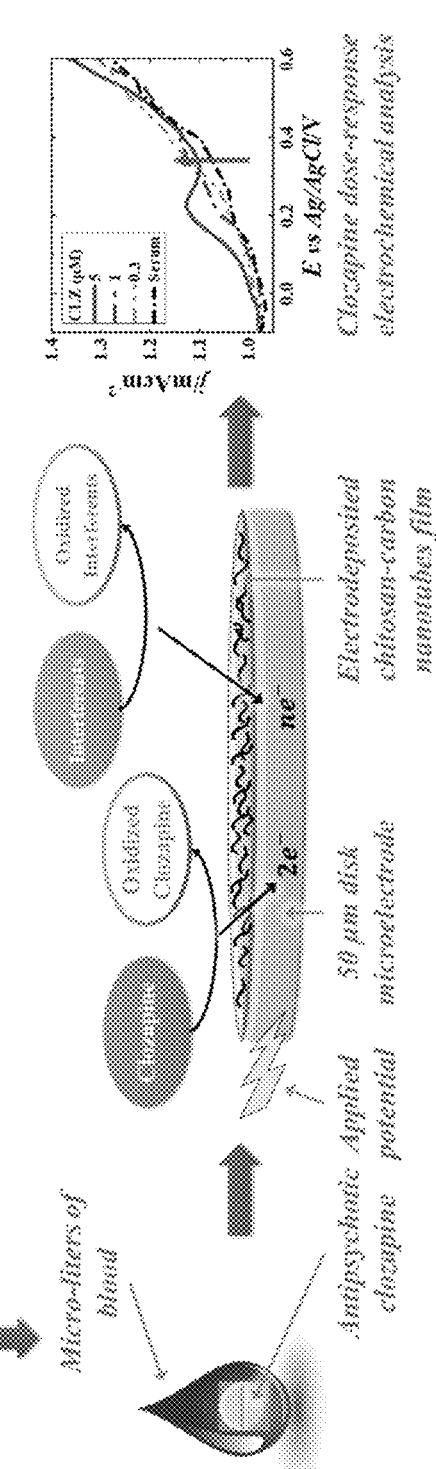
FIG. 1 shows the electrochemical detectability of clozapine in a blood sample using a single surface-modified electrode to generate an electrochemical signal indicative of clozapine concentration.
Figure 2:
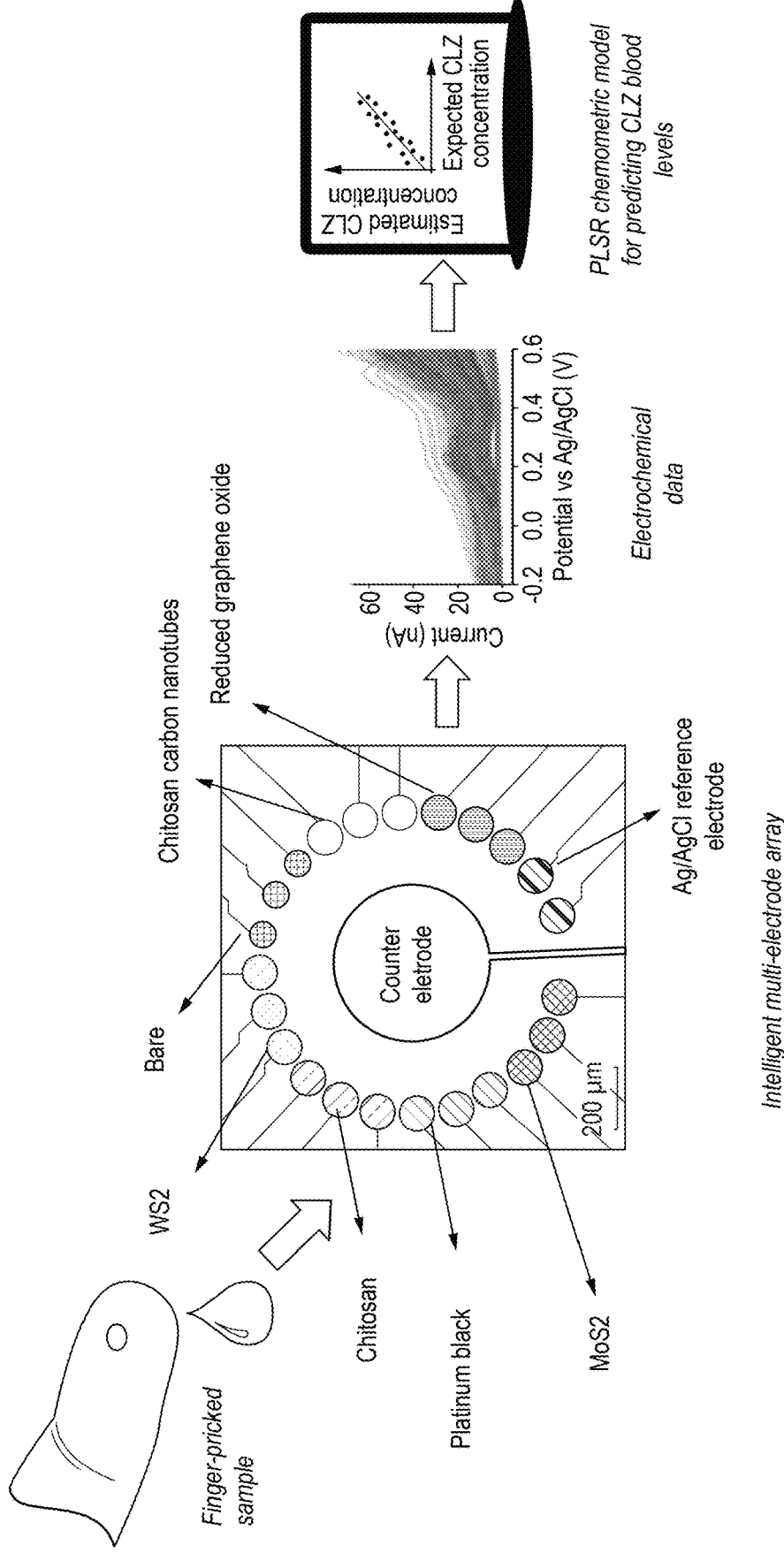
FIG. 2 shows the electrochemical detectability of clozapine in a blood sample using an array of multiple surface-modified electrodes to generate an electrochemical signal indicative of clozapine concentration according to the invention.
Figures 3A, 3B, 3C:
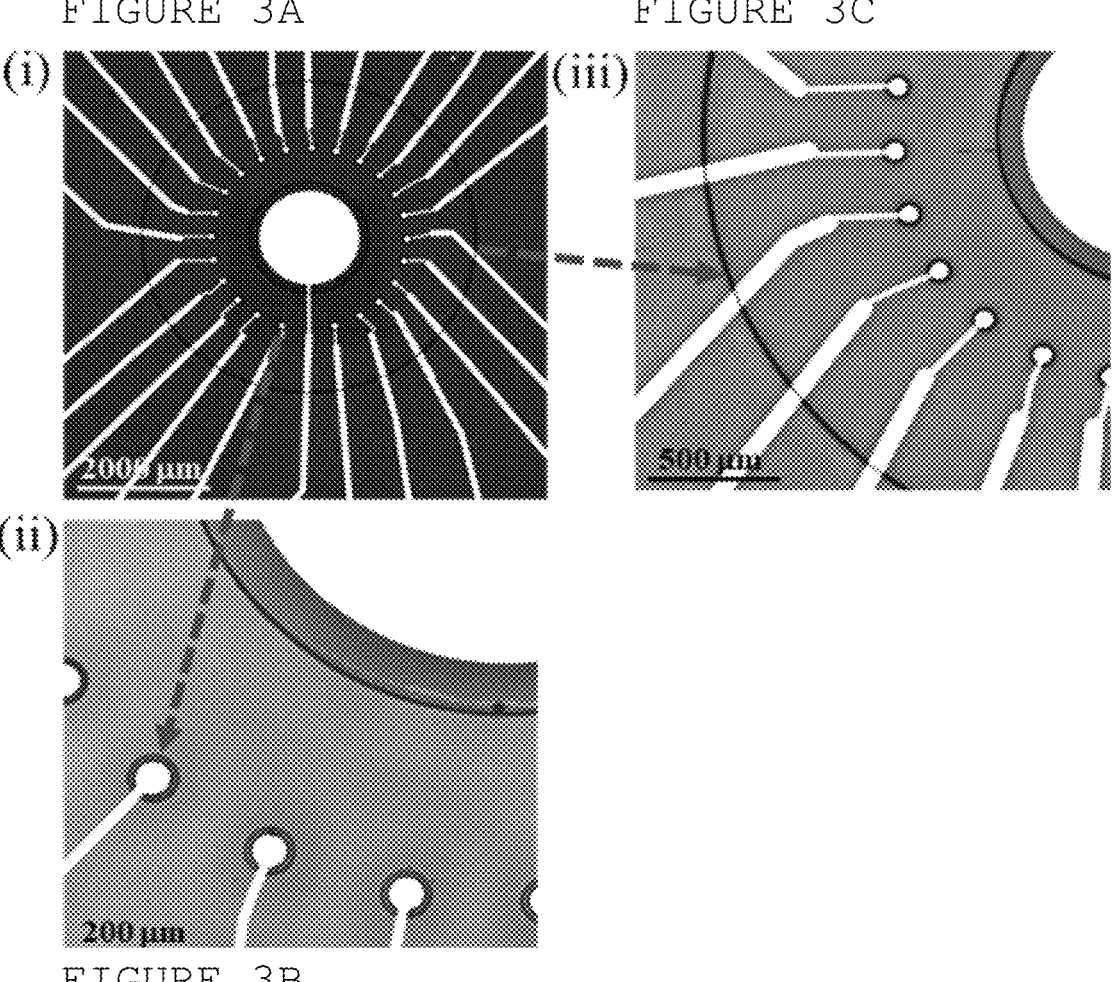
FIG. 3 shows a design of the multielectrode array patterned on a chip (lab-on-chip).
Figure 5:
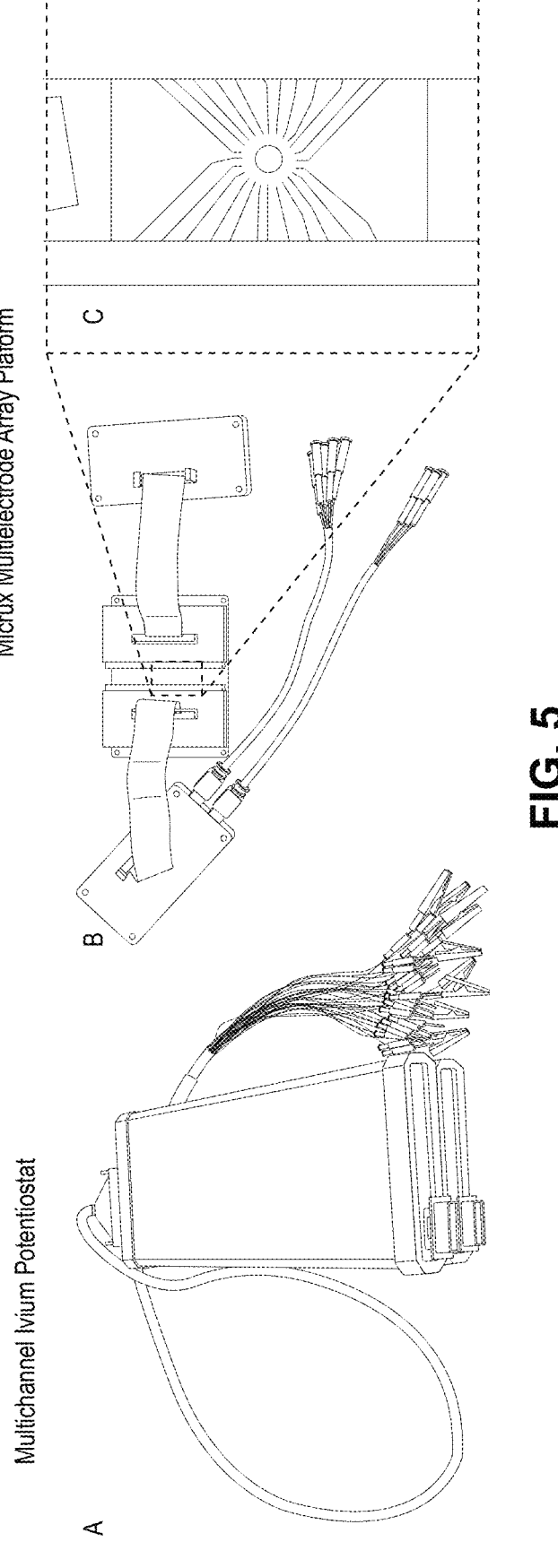

FIG. 5 is a photograph showing the electrical chip of the invention and a potentiostate.

Figure 6:
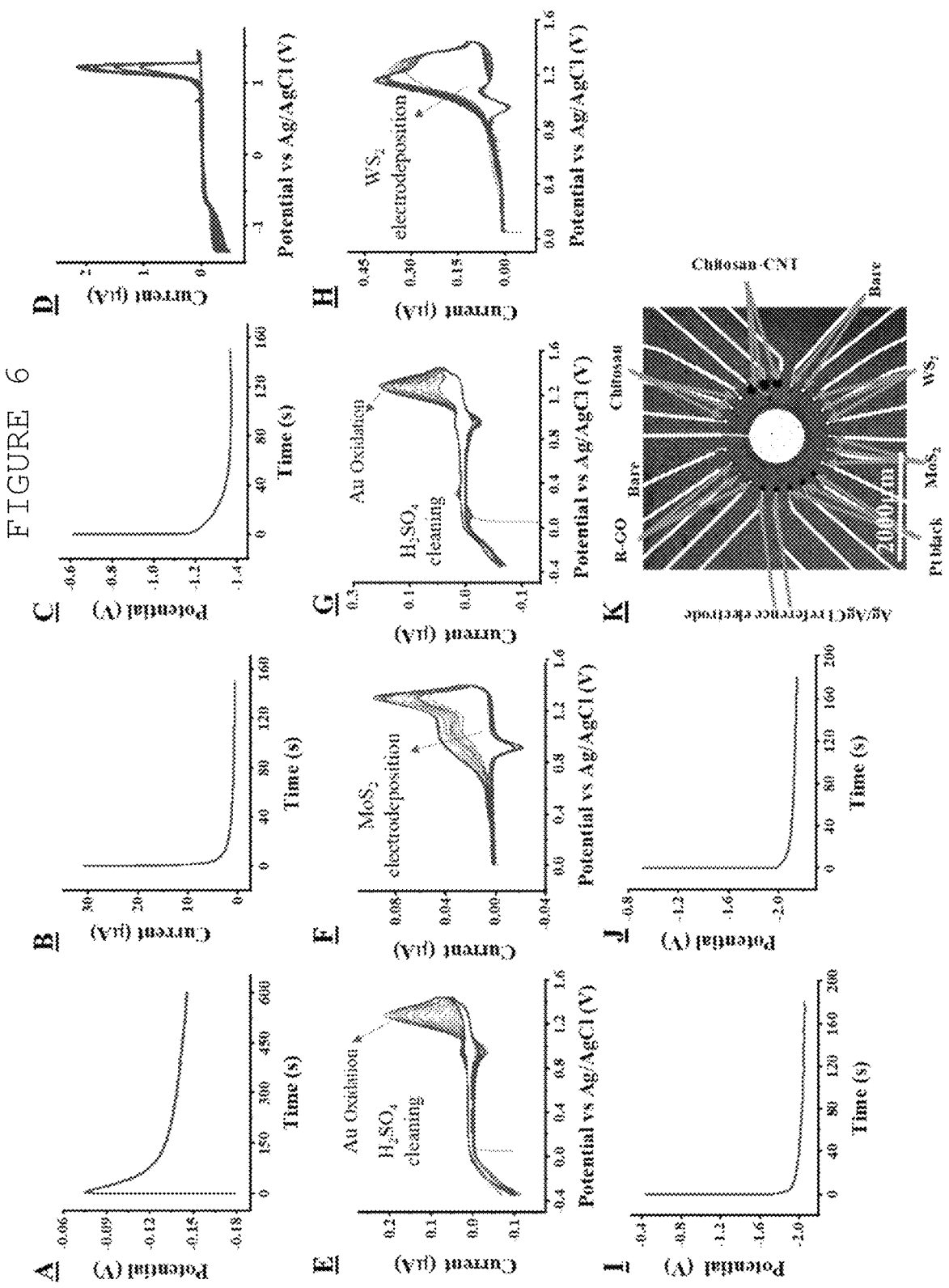

FIG. 6 shows the modifications of gold microelectrodes in the multi-electrode array: (A) Ag (B) AgCl, (C) Pt-black, (D) r-GO, (E) and (F) MoS₂, (G) and (H) WS₂, (I) chitosan, and (J) chitosan-CNT. (K) Optical image of the multielectrode array.

Figure 7:
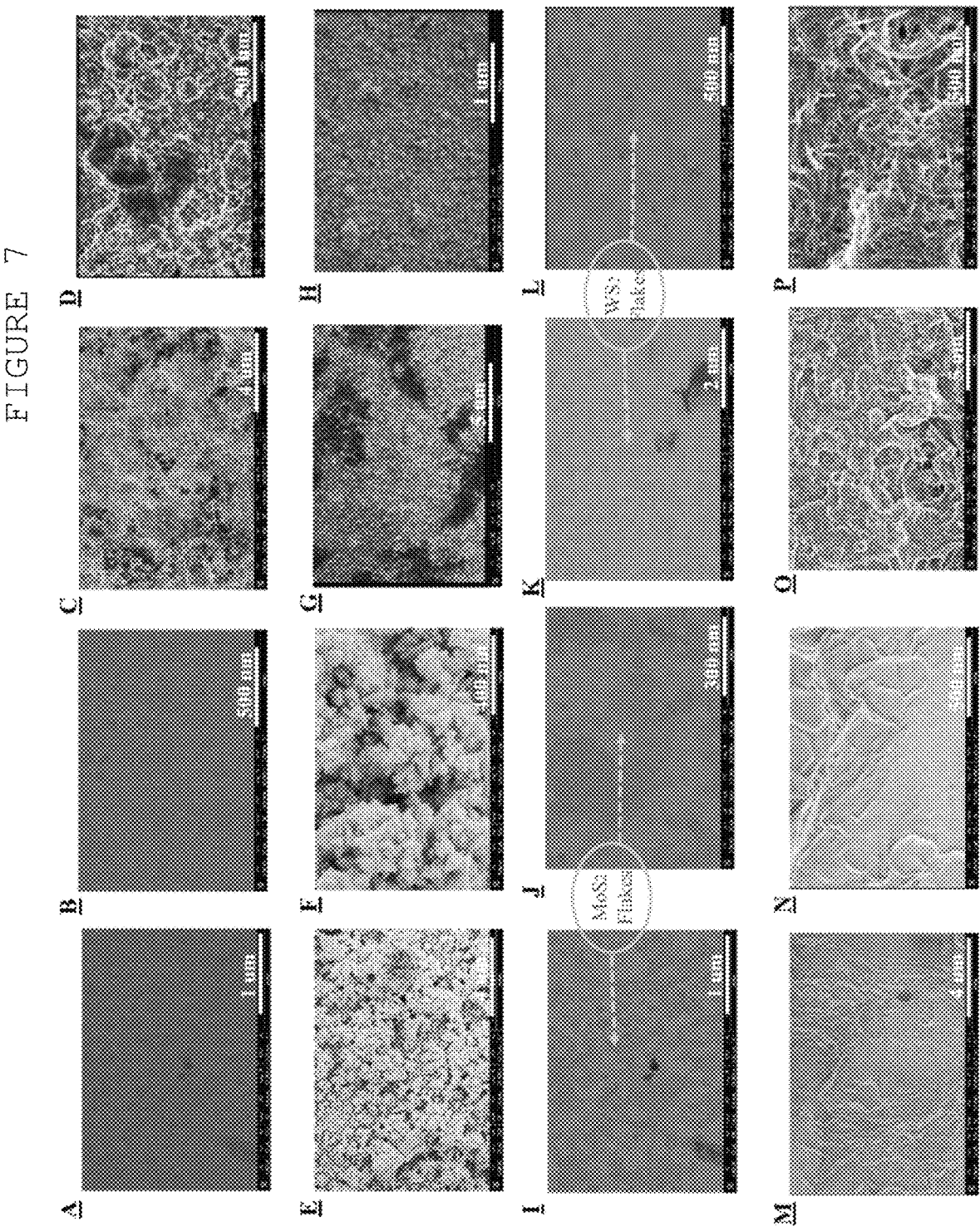

FIG. 7 shows the SEM characterization of the multielectrode array. Low and high resolution image of the (A) and (B) bare, (C) and (D) Ag/AgCl, (E) and (F) Pt-black, (G) and (H) r-GO, (I) and (J) MoS₂, (K) and (L) WS₂, (M) and (N) chitosan, (O) and (P) chitosan-CNT.

Figure 8:
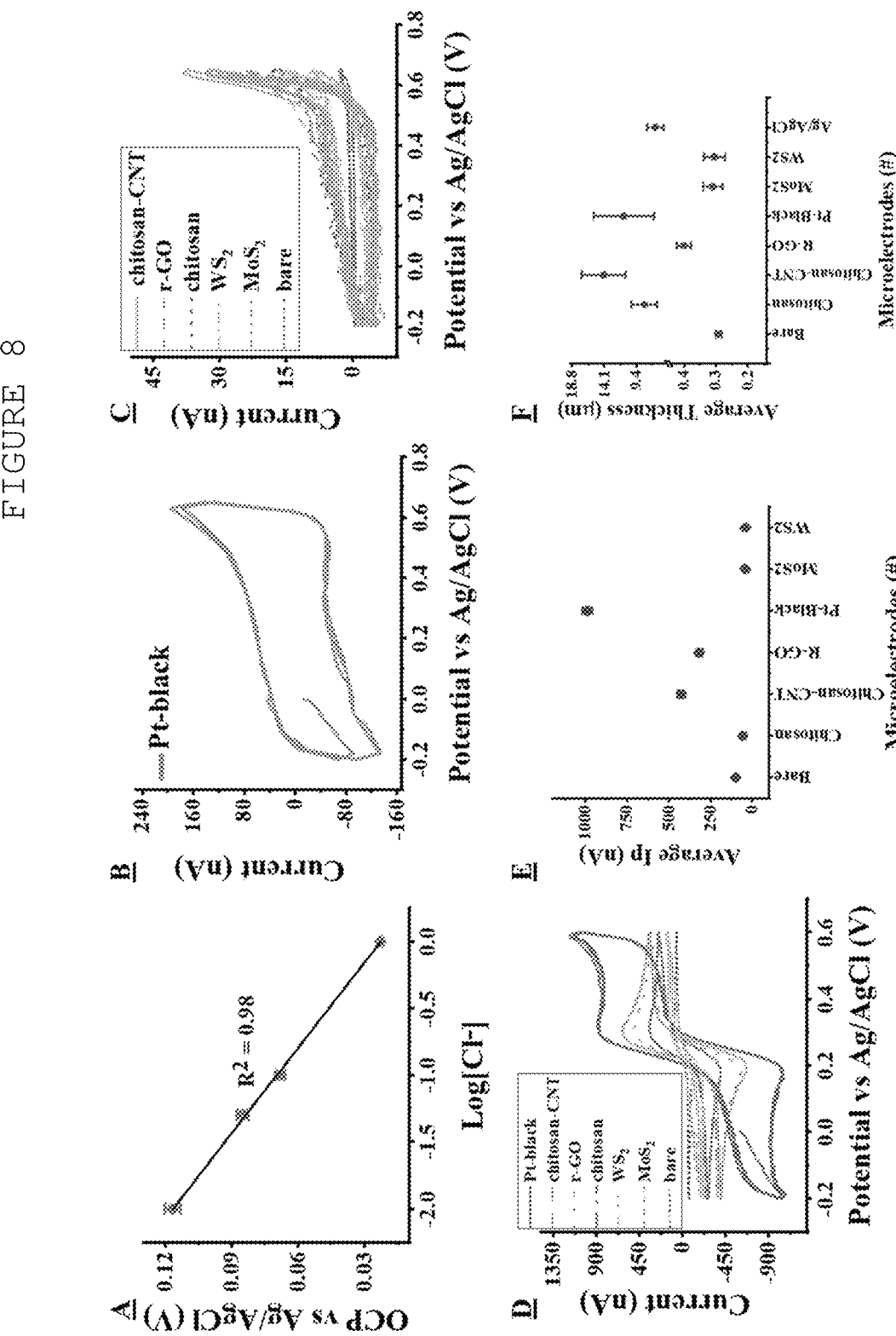
Figure 9:
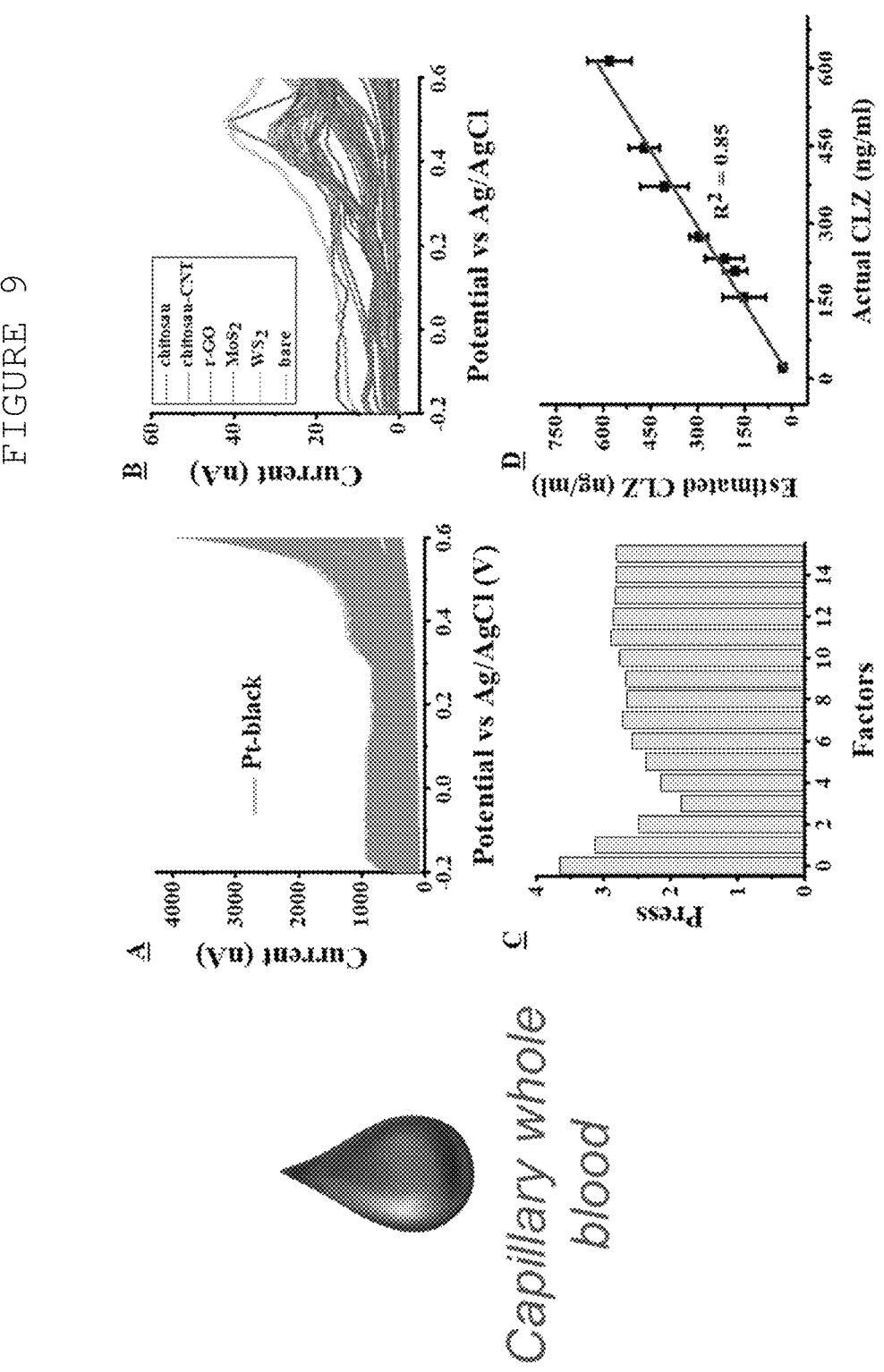

FIG. 8 show electrochemical characterization of the multi-electrode array. (A) Linear regression of the OCP vs log(Cl⁻), CVs recorded in 10 mM PBS solution using (B) Pt-black -modified and (C) chitosan, chitosan-CNT, r-GO, MoS₂, WS₂ -modified and bare microelectrodes in the multielectrode array. (D) CVs recorded in 5 mM ferricyanide/ferrocyanide solution using multi-electrode array, (E) intrachip reproducibility for the oxidation peak current for each modification, and (F) intra-chip reproducibility for the thickness measurement in the multielectrode array FIG. 9 illustrates measuring clozapine in capillary whole blood samples of schizophrenia patients by the multielectrode array (DPV), using (A) Pt-black (blue), and (B) Chitosan (light black), chitosan-CNT (red), r-GO (light blue), MoS₂ (green), WS₂ (light purple) -modified and bare microelectrodes (dark yellow) in the multi-electrode array, (C) PRESS vs the factors, and (D) Linear regression of estimated vs the actual CLZ concentrations using the PLSR model.

Figure 10:
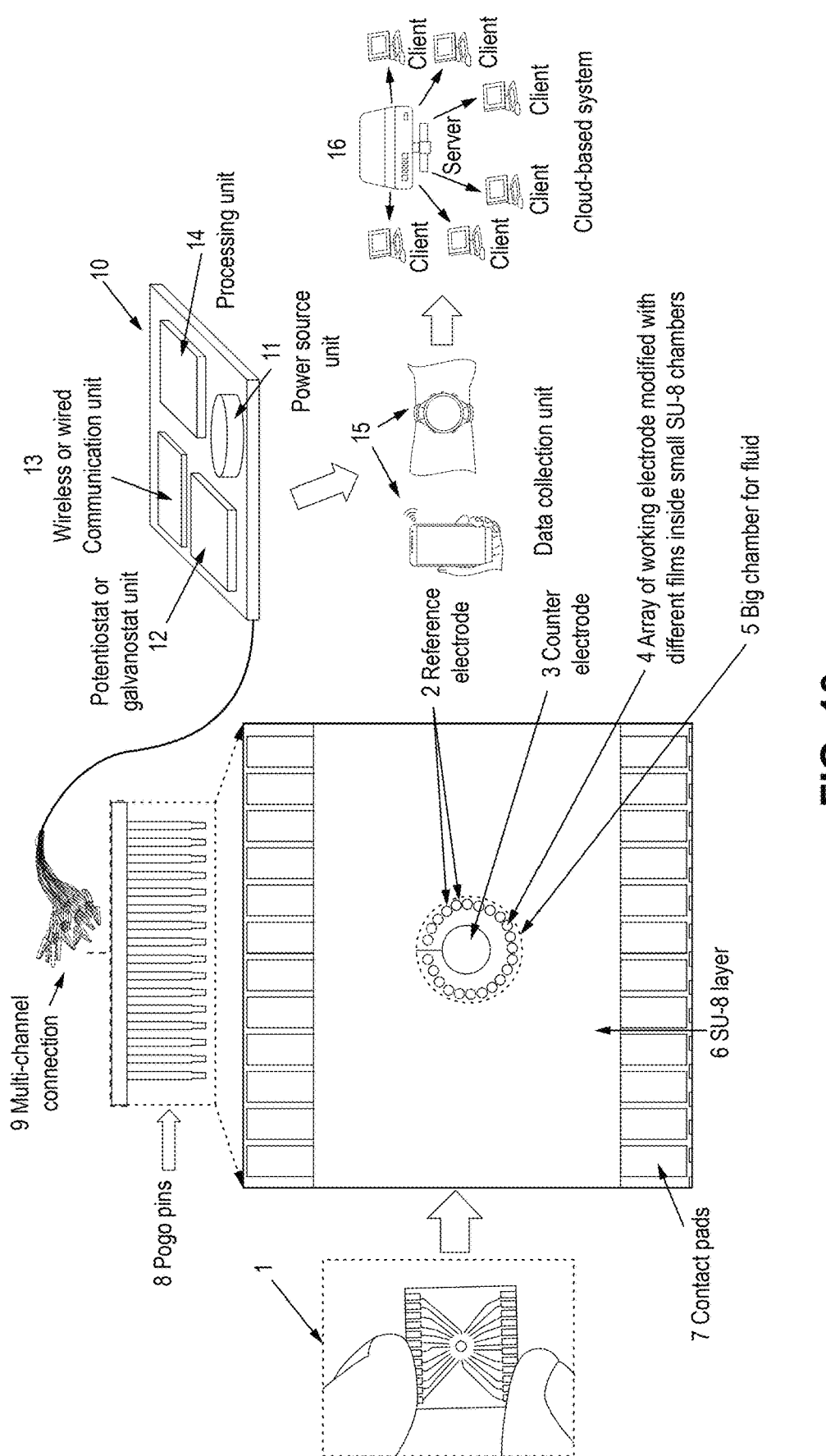

FIG. 10 is a schematic illustration of the device of the invention suitable for use as point-of-care testing device.

EXAMPLES

Preparations 1-7

Electrodeposition Solutions

1) Ag and HCl Solutions

Silver nitrate, Ammonium carbonate, 5-Sulfosalicylic Acid Dihydrate, and Piperazine were mixed in the ratio of 2:1:6:2 in DI water. The solution was stirred at 400 rpm for 10 minutes. The solution pH was adjusted to 9.5 by adding 0.25 M ammonium solution in several steps. The 0.25 M ammonium solution used to adjust the pH was prepared from ammonium hydroxide. 0.1 M HCl solution was prepared from 10.2 M HCl stock solution which was used to chlorinate the Ag to Ag/AgCl surface.

In addition, KCl solution was prepared to characterize the Ag/AgCl reference microelectrode. 1 M KCl stock solution was prepared from KCl powder, which was further diluted to 0.5, 0.1, and 0.001 M different concentrations.

2) Platinum-Black Electrodeposition Solution

Platinum black deposition solution was prepared by mixing 0.5 g of chloroplatinic acid and 25 mg of lead acetate in 50 ml of DI water. The mixture was then stirred and 3.9 μL of concentrated hydrochloric acid (32%; 10.2 Molar concentration) was added to the mixture. The prepared solution was covered with aluminum foil and stored at room temperature.

3) Graphene Oxide Electrodeposition Solution

Graphene oxide (GO) solution was prepared using a modified Hummers' method. A 9:1 ratio of sulfuric acid and phosphoric acid (100 mL) was prepared and stirred for several minutes. A graphite powder (7.5 g/L, 1 wt. eq.) was added to the mixture under stirring conditions. Potassium permanganate (45 g/L, 6 wt. eq.) was slowly added to the solution and the mixture was stirred for 6 h at 30-35° C. until the color turned to dark green. To eliminate the excess of potassium permanganate, hydrogen peroxide 30% w/w (2.5 mL) was added slowly and the mixture was stirred for 10 min, resulting in an exothermic reaction that was left to cool at room temperature. Concentrated 32% hydrochloric acid and DI were sequentially added at a 1:3 volume ratio and the resulting solution was centrifuged at 7000 RPM for 5 min. Residuals of the centrifuged solution were washed 3 times with hydrochloric acid and DI (1:3 v/v). The washed GO solution was dried at 90° C. in an oven (Binder-9010-0082) overnight, yielding the GO powder. Dried GO powder was dissolved in DI, resulting in an electrodeposition solution with 0.5 g/L GO concentration. Next, 100 mM sodium chloride solution was added as an electrolyte to the GO solution, resulting in a final GO electrodeposition solution. At higher GO concentrations, rapid precipitation was observed that prevented the efficient electrodeposition of r-GO.

4) $MoS_2$ Electrodeposition Solution 0.1 mg/mL $MoS_2$ solution was prepared from 1 mg/mL stock monolayer $MoS_2$ solution in 0.1 M $H_2SO_4$ solution and DI water. The solution was sonicated for 10 minutes. 0.1M $H_2SO_4$ solution was prepared from 18.4 M stock $H_2SO_4$ solution.

5) $WS_2$ Electrodeposition Solution 0.1 mg/mL $WS_2$ solution was prepared from 1 mg/mL stock monolayer $WS_2$ solution in 0.1 M $H_2SO_4$ solution and DI water. The solution was sonicated for 10 minutes before electrodeposition.

6) Chitosan electrodeposition solution

A concentrated chitosan solution (1.8%, pH 5.5) was prepared by dissolving chitosan flakes in HCl (2 M) to achieve a final pH of 5-6. Then, the concentrated chitosan solution was diluted with Mili-Q water to obtain a chitosan solution (1%).

7) Chitosan-Carbon Nanotube Electrodeposition Solution

Chitosan-CNT electrodeposition solution was prepared by mixing the chitosan solution (1%, 100 mL) with CNTs (1.75 g, 1.75%), followed by an ultra-sonication (ElmasonicS10H, Elma) step of 20 min and then stored at 4° C.

Example 1

Microfabrication of an Array of Surface-Modified Gold Microelectrodes on Glass Substrate

Step 1: Creating an Array of Bare Gold Microelectrodes

A borosilicate glass substrate was cleaned with acetone, isopropanol, and DI water and then dried with nitrogen gas (FIG. 4A(i)). The photoresist (AZ 5214E) coating process started with spinning the wafer with the photoresist at 2200 RPM for 12 s, followed by a soft bake on a contact hot plate at 110° C. for 2 min and 30 s. Next, the electrode patterns were transferred from the mask using a hard contact of 7.6 mW/cm² for 65 s using a mask aligner (Karl Suss Mask Aligner MA6). The exposed wafer was then developed in AZ 726 MIF developer for 2 min, followed by rinsing in DI water for 5 min (FIG. 4A(ii-iii)). Next, 20 nm of titanium and 200 nm of gold were deposited using the E-gun deposition system (FIG. 4A(iv)). The wafer was then transferred to a beaker with acetone solution for a lift of process that resulted in the Au/Ti microelectrode patterns on a glass substrate (FIG. 4A(v)). The wafer was again rinsed in the DI water for 1 min to remove any residue from the wafer. SU8-3005 was used to define the microelectrode chamber; this allows cleaning the microelectrode with an AMI (acetone, methanol, and isopropanol) solution without destroying the chamber before using it. The process starts with spin coating SU8-3005 at 3000 RPM for 30 s, followed by a soft bake on a contact hot plate at 95° C. for 15 min. Next, the photoresist was exposed to light through the electrodes' mask using a hard contact of 7.6 mW/cm² for 50 s at a Mask Aligner (MA6, SUSS MicroTec). Post Exposer Bake (PEB) for 5 min at 95° C. was used, since this is a negative photoresist and the wafer was cooled down to room temperature. (FIG. 4B (i)). The exposed wafer was then developed in PGMA ERB developer solution for 8 min and washed in isopropanol solution for 10 s. The hard bake on a contact hot plate at 150° C. for 5 min was carried out to remove any hydration on the substrate, and oxygen plasma cleaning (30 W, 500 mTorr, 2 min, 3 sccm) was used after the hard bake to remove any residues or impurities on the substrate (FIG. 4B (ii)). The process of chamber microfabrication was repeated with same parameter but with new SU8 3050 to define the big chamber for solution (FIG. 4B (iii and iv)). The wafer was then coated with photoresist before dicing it into chips using a Dicing saw (ADT-7100). All chips were cleaned with AMI solution before use. The optical image was recorded using optical microscope.

Step 2: Surface Modification of the Microelectrodes

VSP potentiostat (Bio-Logic, Ltd.) was used for the modification of the microelectrodes to create different coatings on the gold surfaces in the multi-electrode array. Coating were electrodeposited using three-electrode cell arrangement or two-electrode cell arrangement.

The three-electrode cell configuration consisted of the microfabricated gold microelectrode(s) as working electrode, an externally applied commercial Pt ring counter electrode with an approximate surface area of 3.6 cm² (CHI115, CH Instruments; counter electrode; 'CE'), and an Ag/AgCl 3 M NaCl reference electrode (CHI111, CH Instruments; reference electrode; 'RE' $E_{SHE}$=0.210+$E_{Ag/AgCl}$).

For the two-electrode configuration (chronopotentiometry) reference electrode was shorted to the Pt ring electrode. All electrochemical potential values are versus Ag/AgCl half-cell potential.

Ag/AgCl Coated Microelectrodes ($n_{Ag/AgCl}$=2)

40 mL of Ag solution (Preparation 1) was used under continuous stirring at 200 rpm to electroplate gold microelectrode surface with Ag, applying the chronopotentiometry technique (cathodic current of 1.5 μA for 10 minutes) to selectively electroplate two microelectrodes simultaneously, by the two-electrode configuration, i.e., with reference electrode connected to ring counter electrode and two working microelectrodes from the chip. After the Ag electroplating, ⅓ to ¼ of the Ag surface was converted to AgCl by chlorination in 0.1 M HCl solution. For this purpose, the total amount of charge, required to convert ⅓ to ¼ portion of electroplated Ag surface to Ag/Cl was calculated. A chronoamperometry technique was applied, at constant potential of 0.22 V under continuous stirring condition at 200 rpm for this purpose. Three electrode system, ring counter, Ag/AgCl reference and Ag electroplated as working microelectrodes were used (equation 1-4).

$$Q_{Ag}=I_{appiled}\times\text{Time}, Q_{req\_max}=Q_{Ag}\ (⅓)\text{ to}$$
$$Q_{req\_min}=Q_{Ag}\ (¼);\qquad(1)$$

$$\text{Example: } Q_{Ag}=1.570\ \mu A\times600\ \text{Sec}=942\ \mu Q;\qquad(2)$$

$$Q_{req\_max}=Q_{Ag}(⅓)=942\ \mu Q\times(⅓)=314\ \mu Q;\qquad(3)$$

$$Q_{req\_min}=Q_{Ag}(¼)=942\ \mu Q\times(¼)=235.5\ \mu Q;\qquad(4)$$

Hence, the amount of charge that needs to be transferred is between 235.5 and 314 μQ using chronoamperometry technique.

FIG. 6A shows the chronopotentiogram of the Ag electroplating onto the Au microelectrode for 10 min. This resulted in two Au surface electroplated with Ag. FIG. 6B shows the chlorination of the two Ag electroplated Au surfaces at a constant potential to Ag/AgCl, by converting the Ag surface to AgCl via charge transfer mechanism.

Open circuit potential (OCP; for 5 minutes) of the Ag/AgCl electroplated gold microelectrode was recorded in different concentration solution of KCl vs the commercial ref. electrode. The recorded potential was plotted against the logarithm of chloride concentration. The slope of the linear regression of the potential vs log[Cl⁻¹] was compared with the standard Randle-Sevcik equation to calculate the slope and standard potential (FIG. 8A). The slope of the linear regression was found to be 0.045 V whereas the intercept was found to be 0.03 V. The results indicate that the so-formed Ag/AgCl electroplated gold microelectrode could serve as reference electrodes.

Platinum-Black Coated Microelectrodes ($n_{Pt}=3$)

Before the gold microelectrodes were modified with the aid of the electrodeposition solution of Preparation 2, the chip was cleaned with AMI solution, followed by rinsing in DI water. The chip was then dried with nitrogen. The chronopotentiometry technique (cathodic current density=4.8 mA/cm², time=5 min) was used to modify gold microelectrodes to create Pt coating. A constant cathodic current (equivalent to current density) of 7.5 μA was applied to three gold microelectrode simultaneously. This allows the deposition of Pt on the gold surface., i.e., by the electrostatic interaction between Pt ions in the solution and the negatively charged Au surface. The chronopotentiogram is shown in FIG. 6C.

Reduced Graphene Oxide Coated Microelectrodes ($n_{r\text{-}GO}=3$)

50 μL of the GO electrodeposition solution (Preparation 3) was dropped on the chamber and the r-GO was selectively deposited using cyclic voltammetry (CV) technique (scanning initial potential $E_i$=−1.4 V vs RE, vertex #1 potential $E_1$=−1.4 V vs RE, vertex #2 potential $E_2$=1.4 V vs RE, scan rate=0.1 V/s, and the number of cycles=3). The electrodeposition process was optimized by varying the number of cycles (1, 2, 3, 4, and 5) and the scan rate (0.05, 0.1, 0.2, 0.3, and 0.5 V/s. Electrochemical modifications were performed using a VSP potentiostat (Bio-Logic, Ltd.) and in a three-electrode cell configuration consisting of the microfabricated microelectrode (working electrode; 'WE'), an externally applied commercial Pt wire (CHI115, CH Instruments; counter electrode; 'CE'), and a Tungsten needle (P/N H-20242, Quarter) coated with Ag/AgCl ink (011464, BAS Inc.; pseudo reference electrode; 'RE'). All electrochemical potential values are versus Ag/AgCl half-cell potential. FIG. 6D shows the CVs scanned over −1.4V to 1.4V at rate of 100 mV/s for three cycles for the electrodeposition of r-GO film on three Au microelectrodes simultaneously.

MoS₂ Coated Microelectrodes ($n_{MoS2}=3$)

The gold multi-microelectrode array chip was dipped in a 10 mL solution of MoS₂ (1 g/L) dispersed in 0.1 M sulfuric acid (see Preparation 4). The material was selectively deposited using CV technique. Prior to the electrodeposition, the gold microelectrodes were electrochemically cleaned using a CV in a 0.5 M H₂SO₄ electrolyte by cycling the potential from −0.4 to 1.4 $V_{Ag/AgCl}$ for 20 cycles until a steady voltammograms representative of a clean substrate is obtained (FIG. 6E). Then, electrodeposition of MoS₂ was achieved across the gold electrochemical double layer potential range (0 to 1.4 $V_{Ag/AgCl}$) at 100 mV/s for 20 cycles, in the three-cell configuration. Three Au microelectrodes were selectively and simultaneously modified in the process, i.e., by the oxidation of MoS₂ through gold-thiol interaction using CV technique in the MoS₂ solution (FIG. 6F).

WS₂ Coated Microelectrodes ($n_{WS2}=3$)

A protocol akin to the one described for the MoS₂ electrodeposition was used to form WS₂ coatings on three gold microelectrodes, which were simultaneously modified with the aid of the WS₂ electrodeposition solution of Preparation 5. The microelectrodes were first cleaned in 0.1 mM sulfuric acid solution in the voltage range from −0.4 to 1.4V for 20 cycles. This allows the oxidation of different facets of polycrystalline gold. WS₂ films were then produced using cyclic voltammetry (20 cycles, 0.1V/s rate, and voltage range: 0 to 1.4V) by the oxidation of WS₂ and allowing the formation of gold-thiol interaction. FIGS. 6G and 6H show the CVs of the Au microelectrode cleaning (6G) and electrodeposition of WS₂ on to the surface (6H) of three Au microelectrodes simultaneously.

Chitosan Coated Microelectrodes ($n_{chitosan}=3$)

The chronopotentiometry technique was used to modify three gold microelectrodes in the arrayed chip with time $t_s=3$ min and cathodic current $j_s$=−4 μA/cm². To this end, a two-electrode configuration was used, i.e., the counter electrode was shorted to reference terminal (see Preparation 6 for the electrodeposition solution). The electrodeposited microelectrodes were kept in buffer solution for 10 minutes to allow the weakly connected chitosan to be removed from the gold microelectrode surface. FIG. 6I shows the chronopotentiogram for the electrodeposition of chitosan film on the Au microelectrodes.

Chitosan-Carbon Nanotubes Coated Microelectrodes ($n_{chitosan\text{-}CNT}=3$)

A protocol akin to the one described for the chitosan electrodeposition was used to form chitosan-CNT coatings on three gold microelectrodes (see Preparation 7 for the electrodeposition solution). FIG. 6J shows the chronopotentiogram for the electrodeposition of chitosan-CNT film on the Au microelectrodes.

FIG. 6K shows the optical image of bare and chitosan, chitosan-CNT, $MoS_2$, $WS_2$, r-GO, and Pt-black -modified gold microelectrodes along with on chip Ag/AgCl reference microelectrode in the multi-electrode array.

Example 2

Characterization of the Surface-Modified Gold Microelectrodes

SEM Analysis

An optical microscope (MX-50A, Olympus) was used to image the microelectrode before and after surface modifications. Electron micrograph images were obtained with a scanning electron microscope (JSM-7400F, JEOL Ltd.).

The presence of the materials in the multi-electrode array was examined using SEM (FIG. 7). FIGS. 7A and 7B show the bare gold microelectrode (7A; low resolution and 7B; high-resolution image). The high-resolution micrograph of the bare microelectrode shows the polycrystalline gold surface with its grain boundaries. FIGS. 7C and 7D show the electroplated gold microelectrode with Ag/AgCl (7C; low resolution and 7D; high-resolution image). The images reveal a porous structure of the metallic silver and silver chloride composite on to the gold microelectrode. The clusters of the Ag/AgCl can be clearly visualized in the high resolution micrograph. The presence of Pt-black was visualized in FIGS. 7E and 7F (7E: low resolution and 7F: high-resolution image). The electron micrographs indicate the porous assemblies of interconnected Pt-black crystals onto the gold microelectrode, which ensures an increased surface area. FIGS. 7G and 7H show the presence of r-GO flakes on the bare gold microelectrode (7G; low resolution and 7H; high-resolution image). The micrographs suggest the aggregation of the r-GO flakes onto the gold microelectrode. $MoS_2$ nano flakes were visualized in FIGS. 7I and 7J (7I; low resolution and 7J; high resolution image). The electron micrographs reveal the presence of the gold microelectrode surface with $MoS_2$ nano flakes. $WS_2$ nano flakes were observed in FIGS. 7K and 7L (7K; low resolution and 7L; high resolution image). The micrograph shows the presence of $WS_2$ nano flakes onto the gold microelectrode surface which was modified with $WS_2$ monolayer solution. The electron micrograph in FIGS. 7M and 7N (7M; low resolution and 7N; high resolution image) show the surface morphology of the chitosan biopolymer on the bare gold microelectrodes whereas FIGS. 7) and 7P (7O; low resolution and 7P; high resolution image) reveal the presence of CNTs dispersed in biopolymer chitosan on the bare gold microelectrode.

Electrochemical Characterization

The detailed electrochemical characterization of the multi-electrode array was performed by recording the CVs in 10 mM PBS solution and in 5 mM ferricyanide/ferrocyanide solution. FIGS. 8B and 8C show the CVs recorded in 10 mM PBS solution using only Pt-black -modified microelectrode and the other material modifications, respectively, which is indicative of the background capacitive current that depends on the electroactive surface area of the bare and modified microelectrodes in the multi-electrode array. From FIGS. 8B and 8C, it is clear that the Pt-black -modified microelectrode has shown the highest background capacitive current as compared to all other modifications, which is due to the porous structure of the Pt-black that is clustered on to the gold microelectrode surface resulting in an increase in overall electroactive surface area of the microelectrode. FIG. 8D shows CVs recorded in 5 mM ferricyanide/ferrocyanide redox probe using the multi-electrode array, which shows the Nernstian behavior with $I_{pa}/I_{pc} \sim 1$ for all the microelectrodes (modified and bare) in the multi-electrode array ($I_{pa}/I_{pc}$=0.88 for Pt-black, $I_{pa}/I_{pc}$=0.92 for chitosan-CNT, $I_{pa}/I_{pc}$=0.95 for r-GO, $I_{pa}/I_{pc}$=0.96 for chitosan, $I_{pa}/I_{pc}$=0.96 for $MoS_2$, $I_{pa}/I_{pc}$=0.98 for $WS_2$, and $I_{pa}/I_{pc}$=0.98 for bare electrode). The Pt-black modified microelectrode has shown higher oxidation current as compared to microelectrode modifications (1.4, 1.8, 2.5, 6.9, 7.2, and 6.1 times higher than chitosan-CNT, r-GO, chitosan, $MoS_2$, $WS_2$ and bare) due to its high effective surface area and electrocatalytic activity.

Repeatability

For repeatability analysis, two microchips were coated with all the material modifications. Cyclic voltamograms in 10 mM PBS buffer before and after coating for 40 cycles (or more, depends on background signal stability) were recorded simultaneously. Following the PBS measurements, 20 cycles of voltamograms were recorded simultaneously in 5 mM ferrocyanide/ferricyanide before and after coating. After electrochemical measurements, thickness of the coatings were measured using AFM and profilometry (the thickness of the chitosan, chitosan-CNT film, Pt-black, and Ag/AgCl was measured by using a contact profilometry (Dektak-8, Veeco Ltd.). The thickness and the roughness of the r-GO film, $MoS_2$ and $WS_2$ were characterized using atomic force microscopy (MFP-3D-Bio, Asylum Research/ Oxford Instruments) as they were very thin films as compared to other modifications. The same experiment was repeated five times; electrochemical measurement in PBS and ferrocyanide/ferricyanide followed by thickness measurements. The average peak oxidation current of 20 cycles and thickness for each modification was determined for each repetition and it was found that the fifth repetition has RSD value in thickness measurement of 2.7% for bare, 22% for chitosan, 17.98% for Chitosan-CNT, 4.2% for r-GO, 15.3% for Pt-black, 4.7% for $MoS_2$, 4.3% for $WS_2$, and 13.1% for Ag/AgCl. For $4^{th}$ repeat the RSD in thickness measurement was below 10% for all the modification, indicating that the coating thickness was repeatable until four repeats.

Reproducibility

For the reproducibility analysis, five microchips were modified with all the modifications. For each chip the electrochemical measurement was performed in 10 Mm PBS followed by 5 mM ferricyanide/ferrocyanide solution. The average oxidation current for each coating was calculated and plotted against each coating. The RSD value of average oxidation current calculated for each modification for two chips (inter-chip; 6 microelectrode for each coating) and it was found below 10% (bare:6.1%, chitosan:8.6%, chitosan-CNT: 3.7, r-GO: 2.5%, Pt-black: 4.9%, $MoS_2$: 4.8%, and $WS_2$: 7.9%). The statistical t-test was performed which shows the $p < 0.05$ for unpaired t-test. After electrochemical characterization of each chip, the thickness measurement was done using AFM and profilometry. The inter-chip RSD value in thickness measurement was also found below 10%

(bare: 2.3%, chitosan: 7.6%, chitosan-CNT: 9.7, r-GO: 3.8%, Pt-black: 9.7%, $MoS_2$: 7.0%, $WS_2$: 7.1%, and Ag/AgCl: 6.7%). This shows that the multi-electrode array is reproducible in terms of electrochemical response as well as in thickness of each coating (FIGS. 8E and 8F).

Storage Stability

Five chips were modified with different materials and electrochemical measurement in 10 mM PBS, and in 5 mM ferro/ferricyanide solution were done simultaneously at day zero. The thickness measurement was also done at the same day. The chips were stored in separate bottles filled with PBS and kept in a dark and cool place. After one week, microchip #1 was taken out for the electrochemical and thickness measurement. Similarly, microchip #2 was characterized after two weeks, microchip #3 after three weeks, microchip #4 after four weeks, and microchip #5 after five weeks. The change in the electrochemical response and thickness was calculated as compared to day zero.

The thickness as found at the end of the five weeks test period was 99.08% for bare, 71.7% for chitosan, 77.8% for chitosan-CNT, 92.9% for r-GO, 78.8% for Pt-black, 85.7% for $MoS_2$, 88.8% for $WS_2$, and 60.86% for Ag/AgCl.

Raman spectrograms were measured by using a Raman spectrometer (LabRam HR, Horiba Ltd.).

Example 3

Detecting Clozapine in Blood Samples of Schizophrenia Patients Using the Multielectrode Array

Patients' Blood Processing SOP

Ten participants who had consented as part of a larger trial to have blood samples taken by finger-prick were recruited for the study. Participants in the study were diagnosed with schizophrenia or schizoaffective disorder and were eligible for clozapine treatment. Additionally, exclusion criteria included significant medical disorders or contraindications to the medication. Participants were generally titrated over the first month of treatment. Blood samples were collected prior to the start of clozapine treatment and at approximately 8-10 weeks after the start of clozapine treatment. Venous and capillary blood samples were collected at each visit. Approximately 8.5 mL of venous blood was collected in a red top BD (Becton, Dickinson and Company, Ltd.) collection tube using standard blood-drawing methods. Venous blood samples were centrifuged for 15 min at 1500 RCF and the serum was pipetted into a 3.5 mL transport tube and sent to Labcorp for clozapine blood serum analysis using LC-MS/MS technology.

Approximately 4 600 uL lavender top BD microtainers of capillary blood were collected via finger prick using 2 mm lancets and the Innovac Quick Draw capillary whole blood collection system. Whole blood from 2 of the microtainers were pipetted into a 1.5 mL freezer tube. Whole blood from the remaining 2 microtainers of capillary whole blood were centrifuged for 15 min at 1500 RCF and the serum was pipetted into 2 1.5 mL freezer tubes. Both the whole blood and plasma samples were stored in a −80° C. freezer prior to being sent to the laboratory for electrochemical analysis. The samples were thawed in an ice bucket before use.

Electrochemical Detection of Clozapine

The electrochemical signature of clozapine in whole blood, capillary plasma and capillary whole blood samples of schizophrenia patients was determined. 20 µL sample volume was used for all the sample measurements. The electrochemical data for each sample was recorded in two steps due to the limitation of the machine to record highly variable electrochemical signals. Three electrochemical signals for three Pt-black -modified microelectrode in the multi-electrode array was recorded simultaneously and then 18 electrochemical signals from rest of the modifications were recorded simultaneously. DPV technique was used (pulse width: 1 msec, pulse height: 55 mV, scan rate: 10 mV/sec, step height: 2 mV, Equilibration time: 10 sec, current range: 10 µA), to obtain relevant information on the redox reactions of clozapine in different solutions based on their standard potential. On chip Ag/AgCl as a reference microelectrode, and gold microelectrode in the center as a counter electrode, were used.

FIG. 9A and 9B show the smoothed DPVs recoded from 20 µL volume of capillary whole blood sample using the Pt-black -modified microelectrode only, and chitosan, chitosan-CNT, r-GO, $MoS_2$, $WS_2$-modified and bare microelectrodes. The CLZ concentrations that were obtained from the conventional methods were used to train and test the model performance. 80% of the electrochemical data set with full potential range was used to train the model and 20% of the data was used to test the model performance. The training model shows a PRESS value of 1.6 ng/mL (0.004 µM) for 3 number of factors to represent the variance of the electrochemical data set (FIG. 9C).

The linear regression analysis of training set for expected clozapine vs actual clozapine has shown a PCC value of 0.85 and LoD of 12.6±4.3 ng/mL (0.04±0.01) (FIG. 9D).

The trained model was further used to predict clozapine blood levels in patient samples and the predicted values were compared with the values obtained from commercial labs. The predicted values are 438±32.4 ng/mL (1.34±0.10) vs 450 ng/mL (1.4 µM) and 146±18.3 ng/mL (0.50±0.05) vs 131 ng/mL (0.40 µM). This shows a good degree of prediction of clozapine in patient's samples.

To obtain the results reported above, we have used the root mean square error (RMSE; Eq. 1), Pearson correlation coefficient (PCC; Eq.2) between the known and the estimated concentrations, in order to assess the linearity of the proposed model. We have used limit-of-detection (LoD; Eq. 3) in order to evaluate the sensing performance of the model.

$$RMSE_{test} = \sqrt{\frac{1}{N_{test}}(C_{expected} - C_{calculated})^2} \tag{1}$$

$$PCC = \frac{E[C_{expected} - \mu_{expected}]E[C_{estimated} - \mu_{estimated}]}{\sigma^2_{expected}\sigma^2_{estimated}} \tag{2}$$

$$LoD = 3*Sy/x \rightarrow Sy/x = \sqrt{\frac{\sum_i (C_{expected} - C_{estimated})^2}{N_{test} - 2}} \tag{3}$$

Where $C_{expected}$ is known as the concentration in the solution and $C_{estimated}$ is the concentrations that was estimated by the regression model. E[x] describes the execution of the expected operation of specific vector, $\sigma^2_{expected}$ and $\sigma^2_{estimated}$ is the variance for the known concentration vector and the estimated ones, respectively. $N_{test}$ is the number of samples we used for model testing.

The invention claimed is:

1. An electrochemical microsensor comprising an array of working microelectrodes, the array of working microelectrodes comprising:

one or more bare microelectrodes;

one or more thick film-coated microelectrodes, optionally with conductive additive incorporated into the coating, selected from the group consisting of polysaccharide-coated microelectrodes and platinum black-coated microelectrodes;

one or more thin film-coated microelectrodes selected from the group consisting of reduced graphene oxide-coated microelectrode and transition metal chalcogenide-coated microelectrodes, wherein the transition metal chalcogenide is selected from electrodeposited $MoS_2$ and electrodeposited $WS_2$;

wherein;

the electrochemical microsensor further comprises a counter electrode and one or more reference microelectrode(s);

the one or more thick film-coated microelectrodes comprise:

one or more polysaccharide-coated microelectrodes;

one or more polysaccharide-coated microelectrodes with conductive additives incorporated into the coating; and one or more platinum black-coated microelectrodes;

the one or more thin film-coated microelectrodes comprise:

one or more reduced graphene oxide-coated microelectrodes;

one or more $MoS_2$-coated microelectrodes, wherein the $MoS_2$ coating is an electrodeposited $MoS_2$ film; and one or more $WS_2$-coated microelectrodes, wherein the $WS_2$ coating is an electrodeposited $WS_2$ film;

the one or more reference microelectrode(s) is an Ag/AgCl microelectrode; and the electrodeposited $MoS_2$ film consists of 10 to 20 nm thick nanoflakes.

2. The electrochemical microsensor according to claim 1 in the form of lab-on-chip.

3. The electrochemical microsensor according to claim 2, wherein the one or more reference microelectrode(s) and the counter electrode are on-chip, the counter electrode is disc-shaped and in the center of the lab-on-chip.

4. A device for electrochemical detection, comprising:

the electrochemical microsensor as defined in claim 1;

a potentiostat or galvanostat to which the array of working microelectrodes, the counter electrode, and the one or more reference microelectrodes are electrically connected to allow control of a potential or current of the working microelectrodes, respectively, to create a data set of electrochemical signals when the working microelectrodes, the counter electrode, and the one or more reference microelectrodes are immersed in a sample; and a processor configured to analyze the data set of electrochemical signals by one or more chemometric techniques.

5. The device according to claim 4, wherein the potentiostat is configured to record current signals measured by voltammetry.

6. The electrochemical microsensor according to claim 1, wherein the electrodeposited $WS_2$ film consists of 10 to 20 nm thick nanoflakes.

7. The electrochemical microsensor according to claim 1, wherein the surface area of the counter electrode is higher than the total surface of all the working microelectrodes included in the electrochemical microsensor.

8. The electrochemical microsensor according to claim 1, wherein the counter electrode and the one or more reference microelectrode(s) are patterned into the electrochemical microsensor itself, the counter electrode having a circle shape, the array of working microelectrodes and the one or more reference microelectrode(s) being disposed around and at least partially encircling the counter electrode along a single circle shape.

9. An electrochemical microsensor comprising an array of working microelectrodes, the array of working microelectrodes comprising:

one or more bare microelectrodes;

one or more thick film-coated microelectrodes, optionally with conductive additive incorporated into the coating, selected from the group consisting of polysaccharide-coated microelectrodes and platinum black-coated microelectrodes;

one or more thin film-coated microelectrodes selected from the group consisting of reduced graphene oxide-coated microelectrode and transition metal chalcogenide-coated microelectrodes, wherein the transition metal chalcogenide is selected from electrodeposited $MoS_2$ and electrodeposited $WS_2$;

wherein:

the electrochemical microsensor further comprises a counter electrode and one or more reference microelectrode(s);

the one or more thick film-coated microelectrodes comprise:

one or more polysaccharide-coated microelectrodes;

one or more polysaccharide-coated microelectrodes with conductive additives incorporated into the coating; and one or more platinum black-coated microelectrodes;

the one or more thin film-coated microelectrodes comprise:

one or more reduced graphene oxide-coated microelectrodes;

one or more $MoS_2$-coated microelectrodes, wherein the $MoS_2$ coating is an electrodeposited $MoS_2$ film; and one or more $WS_2$-coated microelectrodes, wherein the $WS_2$ coating is an electrodeposited $WS_2$ film; and the one or more reference microelectrode(s) is an Ag/AgCl microelectrode;

the electrochemical microsensor comprising N microelectrodes, wherein at least one of the N microelectrodes is a disc-shaped counter electrode of diameter in the range from 200 to 500 μm and a total of N-1 working and reference microelectrodes are placed evenly around the perimeter of the at least one disc-shaped counter electrode, equidistantly from the center of the at least one disc-shaped counter electrode, wherein the diameter of each individual working and reference microelectrodes is from 10 to 100 μm, wherein each of the N-1 working and reference microelectrodes is individually confined within a microchamber, which corresponds in size and shape to the microelectrode, leaving the upper surface of the microelectrode accessible to a solution or liquid sample, and the entire set of N microelectrodes is encircled by the walls of a larger microchamber, defining a receptable for holding a solution or liquid sample.

10. The electrochemical microsensor according to claim 9 in the form of lab-on-chip.

11. A device for electrochemical detection, comprising:

the electrochemical microsensor as defined in claim 9;

a potentiostat or galvanostat to which the array of working microelectrodes, the counter electrode, and the one or more reference microelectrodes are electrically connected to allow control of a potential or current of the working microelectrodes, respectively, to create a data set of electrochemical signals when the working microelectrodes, the counter electrode, and the one or more reference microelectrodes are immersed in a sample; and a processor configured to analyze the data set of electrochemical signals by one or more chemometric techniques.

12. The device according to claim 11, wherein the potentiostat is configured to record current signals measured by voltammetry.

13. The electrochemical microsensor according to claim 9, wherein the electrodeposited $MoS_2$ film consists of 10 to 20 nm thick nanoflakes.

14. The electrochemical microsensor according to claim 9, wherein the electrodeposited $WS_2$ film consists of 10 to 20 nm thick nanoflakes.

15. The electrochemical microsensor according to claim 9, wherein the surface area of the counter electrode is higher than the total surface area of all the working microelectrodes included in the electrochemical microsensor.

\* \* \* \* \*